US011893303B2

(12) United States Patent
Kim et al.

(10) Patent No.: US 11,893,303 B2
(45) Date of Patent: Feb. 6, 2024

(54) DEVICE AND METHOD FOR PERFORMING MIRRORING

(71) Applicant: Samsung Electronics Co., Ltd., Suwon-si (KR)

(72) Inventors: Raetae Kim, Suwon-si (KR); Yangwook Kim, Suwon-si (KR); Moonjeong Kim, Suwon-si (KR); Jookwan Lee, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/075,041

(22) Filed: Dec. 5, 2022

(65) Prior Publication Data

US 2023/0168854 A1 Jun. 1, 2023

Related U.S. Application Data

(63) Continuation of application No. PCT/KR2022/014033, filed on Sep. 20, 2022.

(30) Foreign Application Priority Data

Nov. 30, 2021 (KR) .......................... 10-2021-0169237
Jan. 11, 2022 (KR) .......................... 10-2022-0003869

(51) Int. Cl.
*G09G 5/00* (2006.01)
*G06F 3/14* (2006.01)
*G06F 1/16* (2006.01)

(52) U.S. Cl.
CPC .......... *G06F 3/1454* (2013.01); *G06F 1/1652* (2013.01)

(58) Field of Classification Search
CPC .... G06F 1/1641; G06F 1/1652; G06F 1/1677; G06F 1/1694; G06F 3/0481;
(Continued)

(56) References Cited

U.S. PATENT DOCUMENTS

| 8,738,826 B2 * | 5/2014 | Stahl | ..................... G06F 3/1423 710/62 |
| 9,552,187 B2 * | 1/2017 | Stahl | ..................... G06T 3/4092 |

(Continued)

FOREIGN PATENT DOCUMENTS

| KR | 10-2008-0059029 A | 6/2008 |
| KR | 10-2013-0138143 A | 12/2013 |

(Continued)

OTHER PUBLICATIONS

International Search Report dated Dec. 16, 2022, issued in International Patent Application No. PCT/KR2022/014033.

*Primary Examiner* — Joe H Cheng
(74) *Attorney, Agent, or Firm* — Jefferson IP Law, LLP

(57) ABSTRACT

An electronic device is provided. The electronic device includes receiving display information of the target device from the target device using a communication module, expanding or reducing a flexible display of the electronic device based on the display information of the target device, generating mirroring data including a content area in which content is displayed and an additional information area in which additional information is displayed based on the display information of the target device, and transmitting the mirroring data to the target device using the communication circuit.

20 Claims, 20 Drawing Sheets

(58) Field of Classification Search
CPC ............... G06F 3/04886; G06F 3/1454; G06F 2203/04102; G06F 2203/04803; G09G 3/035; G09G 3/20; G09G 2340/0442; G09G 2340/0492; G09F 9/301

See application file for complete search history.

(56) References Cited

U.S. PATENT DOCUMENTS

| | | | | |
|---|---|---|---|---|
| 10,203,863 | B2* | 2/2019 | Kwon | G06F 1/1652 |
| 10,216,398 | B2* | 2/2019 | Woo | G09G 5/373 |
| 10,929,002 | B2* | 2/2021 | Lee | G06F 3/04883 |
| 11,244,658 | B1* | 2/2022 | Hong | G06F 3/0483 |
| 11,341,882 | B2* | 5/2022 | Ryu | G06F 3/1462 |
| 11,436,959 | B2* | 9/2022 | Jeong | G06F 3/011 |
| 2013/0265221 | A1* | 10/2013 | Lee | H04N 21/4222 345/156 |
| 2013/0275910 | A1* | 10/2013 | Kim | G06F 1/1652 715/800 |
| 2014/0118317 | A1* | 5/2014 | Song | G06F 1/1652 345/204 |
| 2014/0137041 | A1* | 5/2014 | Jeon | G06F 1/1652 715/815 |
| 2014/0204037 | A1* | 7/2014 | Kim | G06F 3/03 345/173 |
| 2014/0375702 | A1* | 12/2014 | Cho | G06F 3/04886 345/102 |

FOREIGN PATENT DOCUMENTS

| | | |
|---|---|---|
| KR | 10-2015-0050883 A | 5/2015 |
| KR | 10-2017-0024942 A | 3/2017 |
| KR | 10-2017-0090102 A | 8/2017 |
| KR | 10-2018-0109340 A | 10/2018 |
| KR | 10-1918040 B1 | 1/2019 |
| KR | 10-2099176 B1 | 4/2020 |
| KR | 10-2020-0075809 A | 6/2020 |
| KR | 10-2020-0113521 A | 10/2020 |
| KR | 10-2264806 B1 | 6/2021 |

\* cited by examiner

DEVICE AND METHOD FOR PERFORMING MIRRORING

CROSS-REFERENCE TO RELATED APPLICATIONS

This application is a continuation application, claiming priority under § 365(c), of an International application No. PCT/KR2022/014033, filed on Sep. 20, 2022, which is based on and claims the benefit of a Korean patent application number 10-2021-0169237, filed on Nov. 30, 2021, in the Korean Intellectual Property Office, and of a Korean patent application number 10-2022-0003869, filed on Jan. 11, 2022, in the Korean Intellectual Property Office, the disclosure of each of which is incorporated by reference herein in its entirety.

BACKGROUND

1. Field

The disclosure relates to techniques for performing mirroring.

2. Description of Related Art

With the development of wired/wireless communication networks, electronic devices that display a screen to output data that a user may visually recognize may be interconnected through a wired/wireless communication network.

Electronic devices may transmit and receive various data through a wired/wireless communication network, and one electronic device may remotely control another electronic device or one electronic device may be used via another electronic device.

Examples of electronic devices that may be interconnected through a wired/wireless communication network may include a portable computer such as a notebook computer, a netbook or a tablet personal computer (PC), a mobile terminal such as a smartphone or a personal digital assistant (PDA), and/or a television (TV).

When electronic devices are interconnected and used, a service or function desired by a user may be provided more conveniently, and an image of one electronic device may be mirrored to another device.

The above information is presented as background information only to assist with an understanding of the disclosure. No determination has been made, and no assertion is made, as to whether any of the above might be applicable as prior art with regard to the disclosure.

SUMMARY

When mirroring is performed between devices having various aspect ratios, a margin area may be generated, which may reduce the usability of a display.

Aspects of the disclosure are to address at least the above-mentioned problems and/or disadvantages and to provide at least the advantages described below. Accordingly, an aspect of the disclosure is to provide an electronic device capable of providing various information in a margin area of mirroring data during a mirroring operation, fixing a reference point of a content area in the mirroring data without interruption with respect to a change of a screen size, and outputting the content to the electronic device and a target device, and reducing or removing the margin area included in the mirroring data by matching a screen size of a display to a target display of the target device according to a setting.

Additional aspects will be set forth in part in the description which follows and, in part, will be apparent from the description, or may be learned by practice of the presented embodiments.

In accordance with an aspect of the disclosure, an electronic device is provided. The electronic device may include a display including a display screen that has a variable aspect ratio, a communication circuit configured to establish communication with a target device for a mirroring display, a memory configured to store computer-executable instructions, and at least one processor configured to execute the computer-executable instructions by accessing the memory. When the instructions are executed by the at least one processor, the at least one processor may be configured to identify an aspect ratio of the display screen. When the instructions are executed by the at least one processor, the at least one processor may be configured to receive target display information of the target device from the target device using the communication circuit. When the instructions are executed by the at least one processor, the at least one processor may be configured to generate mirroring data including a content area in which content is displayed and a margin area in which additional information is displayed based on the aspect ratio of the display screen and the target display information. When the instructions are executed by the at least one processor, the at least one processor may be configured to change a size of the margin area in the mirroring data based on a change in the aspect ratio of the display screen. When the instructions are executed by the at least one processor, the at least one processor may be configured to change the additional information based on the size change of the margin area in the mirroring data. When the instructions are executed by the at least one processor, the at least one processor may be configured to transmit the mirroring data for image display in the target device to the target device using the communication circuit.

In accordance with another aspect of the disclosure, a method implemented by at least one processor is provided. The method may include establishing communication with a target device having a display that includes a display screen that has a variable aspect ratio for a mirroring display, through a communication circuit. The method may include receiving target display information of the target device from the target device using the communication circuit. The method may include fixing a reference point of a content area in which a first application is displayed in mirroring data for the first application based on the target display information, when mirroring data for the first application of a first category that increases an amount of content or provides additional content for screen expansion is generated. The method may include transmitting the mirroring data for the first application to the target device using the communication circuit.

The electronic device may improve information transfer efficiency within a limited screen size via a margin area.

The electronic device may provide a stable and consistent user experience by fixing the reference point of the content area in the mirroring data to one side or to the central axis.

The electronic device may provide extended control optimized for a target device to be mirrored and a seamless mirroring experience.

The electronic device may reduce screen tearing in a display of one of the electronic device and the target device by matching an aspect ratio of the electronic device to an aspect ratio of the target display based on target display information of the target device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
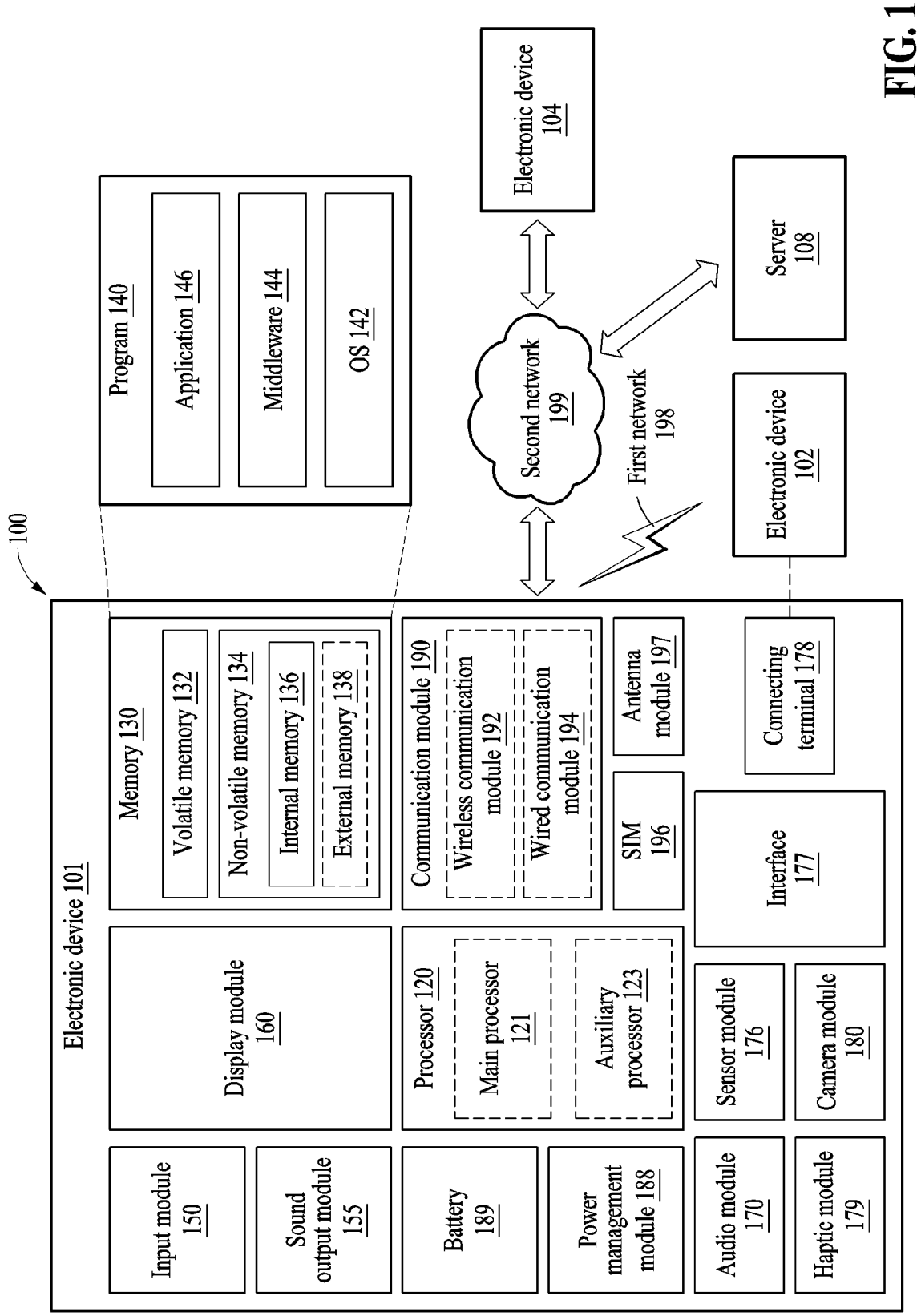
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 or a server 108 via a second network 199 (e.g., a long-range wireless communication network). According to one embodiment, the electronic device 101 may communicate with the external electronic device 104 via the server 108. According to another embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computations. According to yet another embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to yet another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to yet another embodiment, the auxiliary processor 123 (e.g., an ISP or a CP) may be implemented as a portion of another component (e.g., the camera module 180 or the communication module 190) that is functionally related to the auxiliary processor 123. According to yet another embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning algorithms. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to yet another embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the displays, the hologram device, and the projector.

According to yet another embodiment, the display module 160 may include a touch sensor adapted to detect a touch, or a pressure sensor adapted to measure the intensity of force of the touch.

The audio module 170 may convert sound into an electric signal or vice versa. According to yet another embodiment, the audio module 170 may obtain the sound via the input module 150 or output the sound via the sound output module 155 or an external electronic device (e.g., the external electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to yet another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the external electronic device 102) directly (e.g., by wire) or wirelessly. According to yet another embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the external electronic device 102). According to yet another embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus which may be recognized by a user via their tactile sensation or kinesthetic sensation. According to yet another embodiment, the haptic module 179 may include, for example, a motor, a piezoelectric element, or an electric stimulator.

The camera module 180 may capture a still image and moving images. According to yet another embodiment, the camera module 180 may include one or more lenses, image sensors, ISPs, and flashes.

The power management module 188 may manage power supplied to the electronic device 101. According to yet another embodiment, the power management module 188 may be implemented as, for example, at least a part of a power management integrated circuit (PMIC).

The battery 189 may supply power to at least one component of the electronic device 101. According to yet another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., an AP) and that support direct (e.g., wired) communication or wireless communication. According to yet another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the MI 196. The communication module may establish communication with a target device (e.g., the external electronic device 104) for a mirroring display.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to yet another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to yet another embodiment, the antenna module 197 may include an antenna including a radiating element including a conductive material or a conductive pattern formed in or on a substrate (e.g., a printed circuit board (PCB)). According to yet another embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to yet another embodiment, another component (e.g., a radio frequency integrated circuit (RFIC)) other than the radiating element may be additionally formed as a part of the antenna module 197.

According to yet another embodiment, the antenna module 197 may form a mmWave antenna module. According to yet another embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to yet another embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to yet another embodiment, all or some of operations to be executed by the electronic device 101 may be executed by one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request, and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. The external electronic device 104 may be a target device having a target display capable of outputting an image. In yet another embodiment, the external electronic device (e.g., the external electronic device 104) may include an Internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
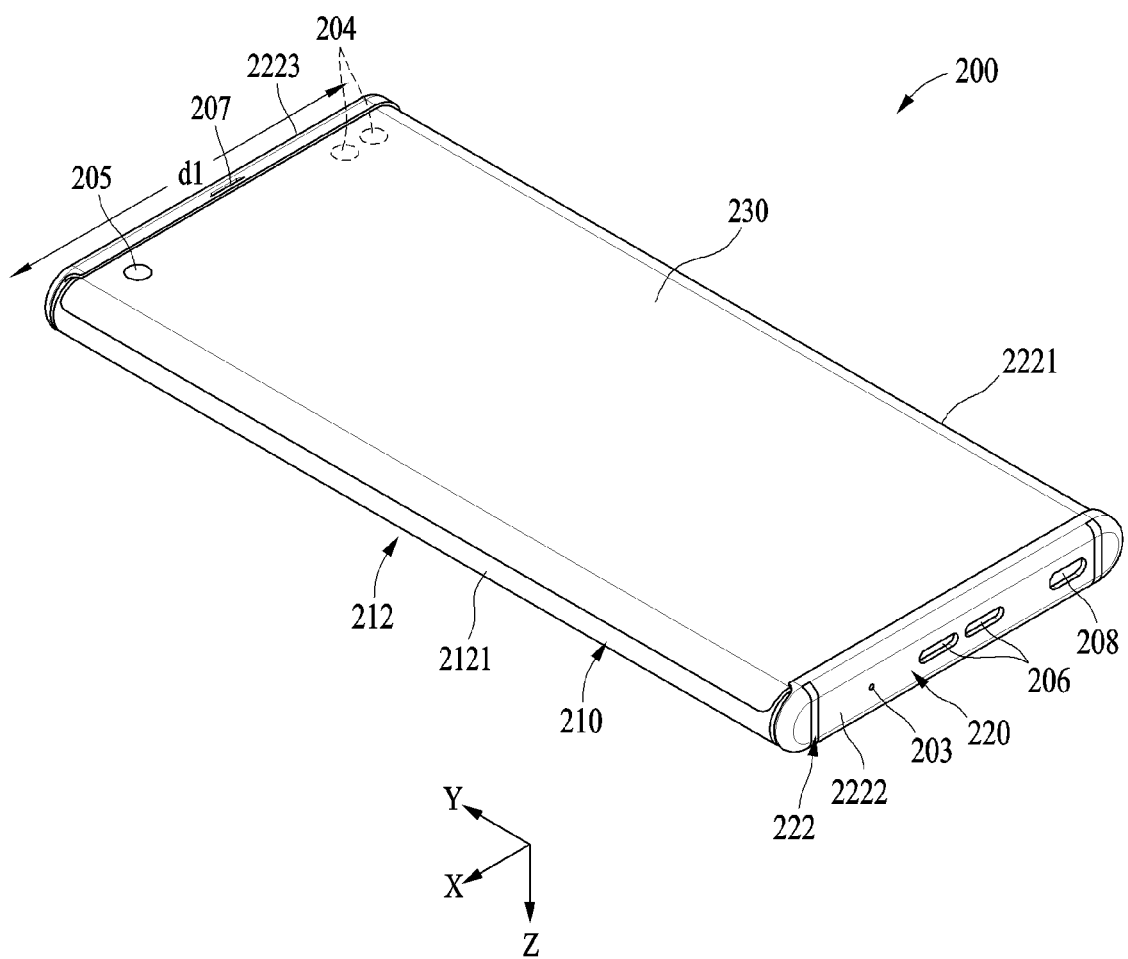
FIGS. 2A and 2B are front perspective views of an electronic device in a closed state and an open state according to various embodiments of the disclosure.
Figure 2B:
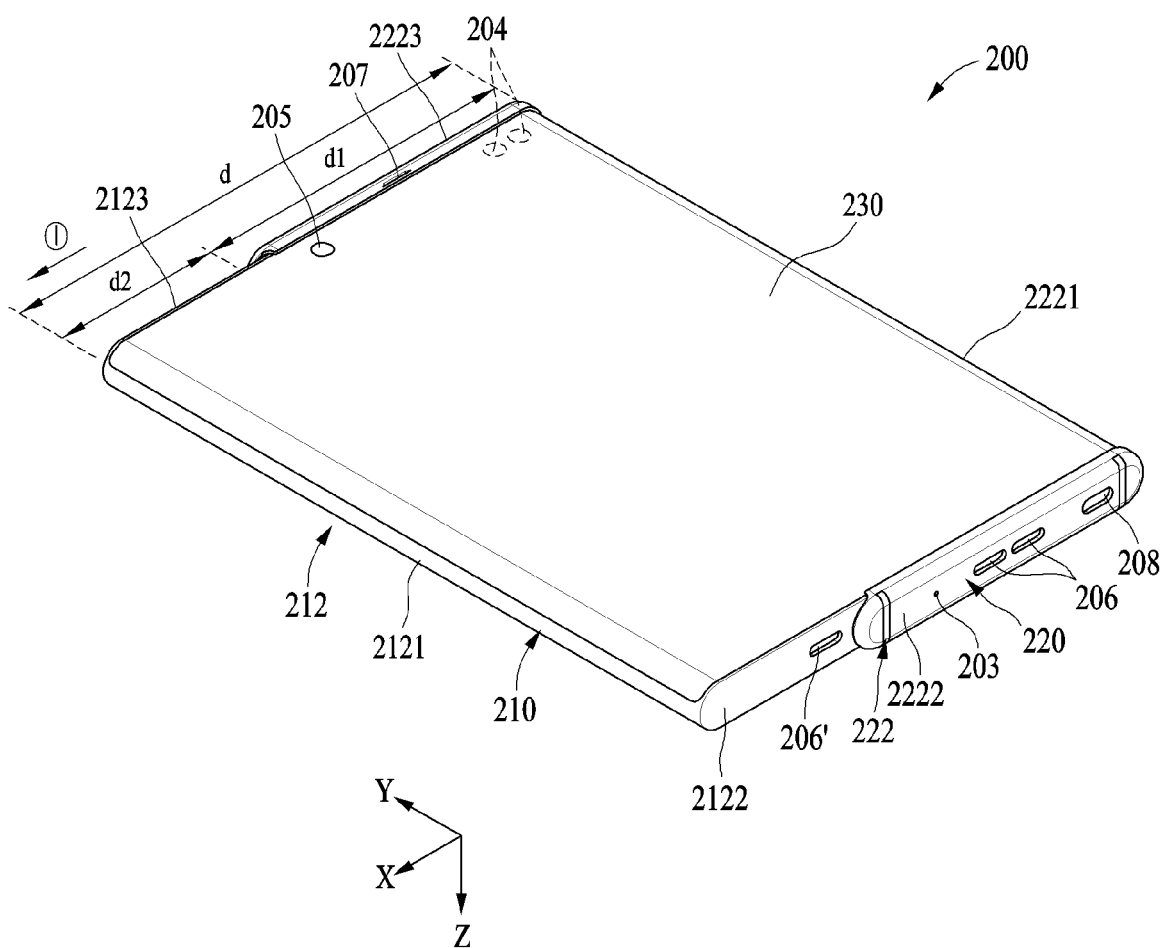

FIGS. 2A and 2B are front perspective views of an electronic device in a closed state and an open state according to various embodiments of the disclosure.

Figure 3A:
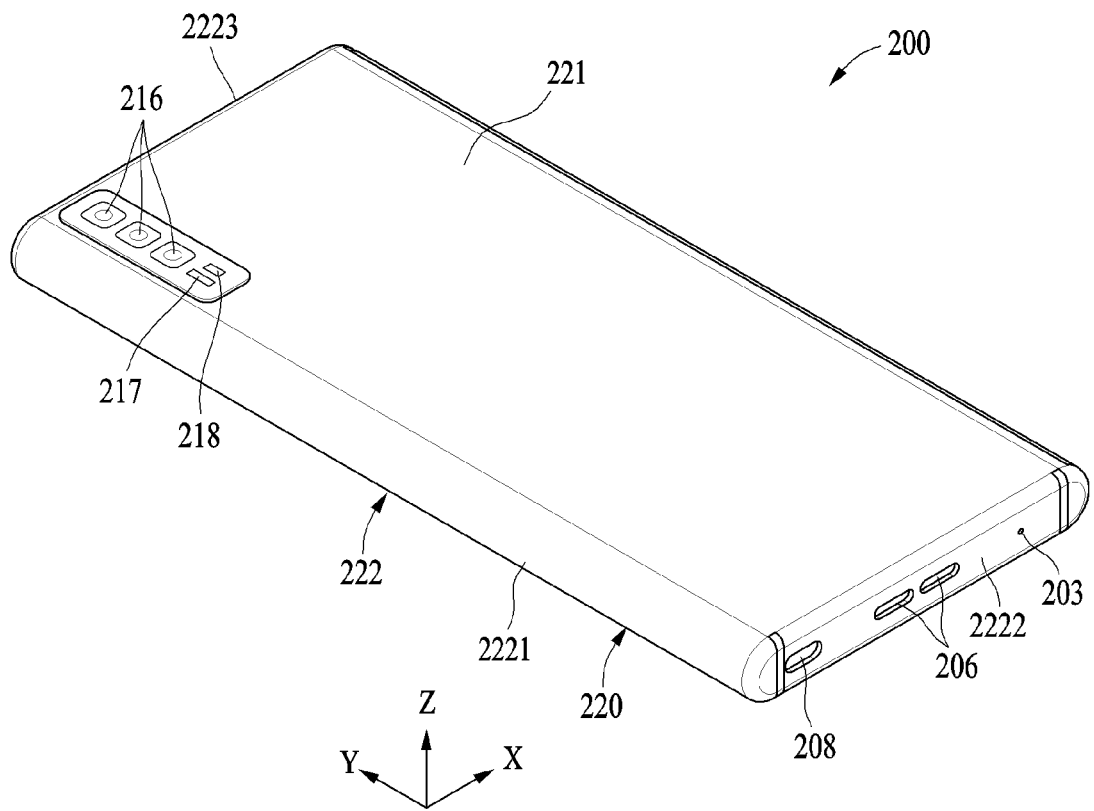
FIGS. 3A and 3B are rear perspective views of an electronic device in a closed state and an open state according to various embodiments of the disclosure.
Figure 3B:
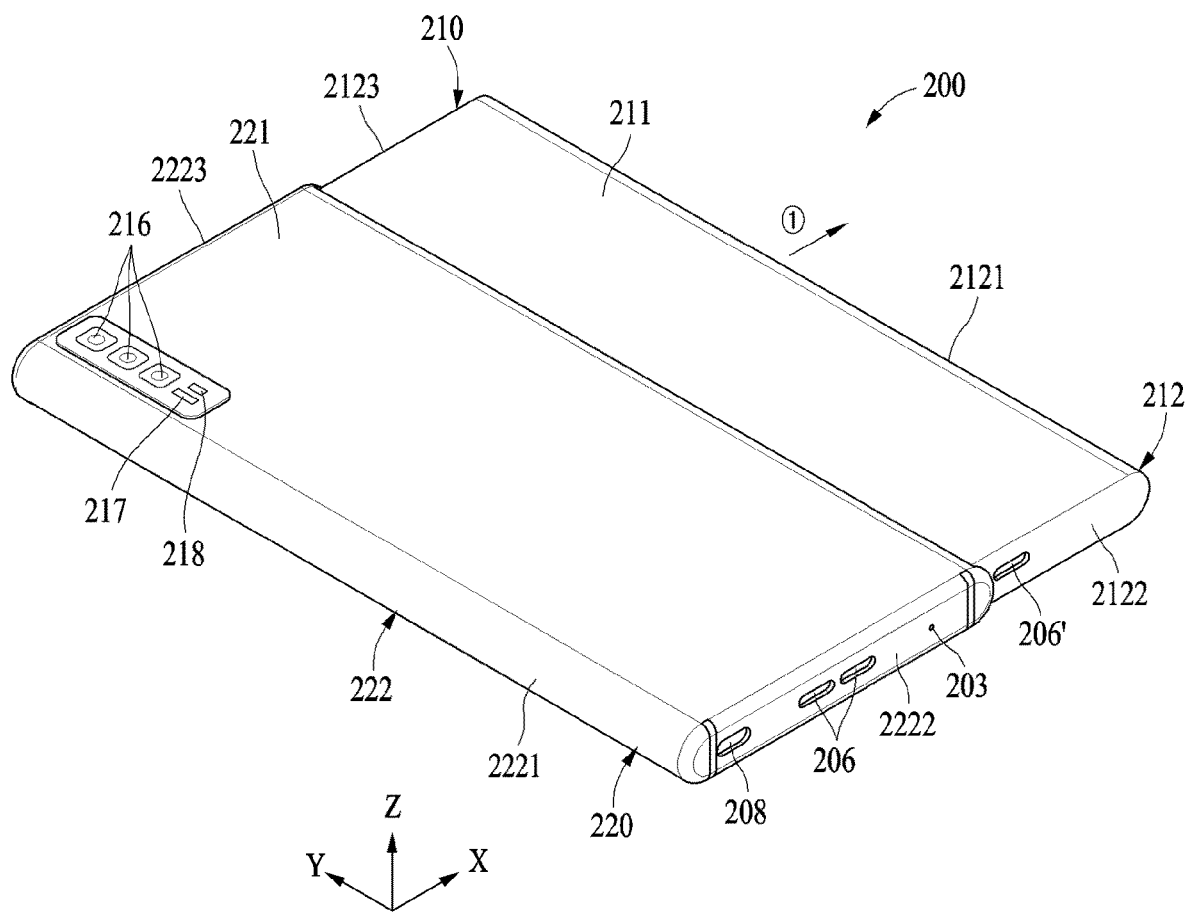

FIGS. 3A and 3B are rear perspective views of the electronic device in a closed state and an open state according to various embodiments of the disclosure.

An electronic device 200 of FIG. 2A may be at least partially similar to the electronic device 101 of FIG. 1, or may further include other embodiments of the electronic device 101.

Referring to FIGS. 2A, 2B, 3A, and 3B, the electronic device 200 may include a first housing 210, and a second housing 220 that is at least partially movably coupled to the first housing 210. According to one embodiment, the first housing 210 may include a first plate 211, and a first side frame 212 that extends in a substantially vertical direction (e.g., a z-axis direction) along an edge of the first plate 211. According to another embodiment, the first side frame 212 may include a first side surface 2121, a second side surface 2122 extending from one end of the first side surface 2121, and a third side surface 2123 extending from the other end of the first side surface 2121. According to yet another embodiment, the first housing 210 may include a first space that is at least partially closed from the outside by the first plate 211 and the first side frame 212.

According to yet another embodiment, the second housing 220 may include a second plate 221, and a second side frame 222 that extends in a substantially vertical direction (e.g., the z-axis direction) along an edge of the second plate 221. According to yet another embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. According to yet another embodiment, the fourth side surface 2221 may extend from a structure other than the second plate 221 and may also be coupled to the second plate 221. According to yet another embodiment, the second housing 220 may include a second space that is at least partially closed from the outside by the second plate 221 and the second side frame 222. According to yet another embodiment, the first plate 211 and the second plate 221 may be disposed to at least partially form a rear surface of the electronic device 200. For example, the first plate 211, the second plate 221, the first side frame 212, and the second side frame 222 may be formed of, for example, a polymer, coated or colored glass, ceramic, metal (e.g., aluminum, stainless steel (STS), or magnesium), or a combination of two or more of the above-mentioned materials.

According to yet another embodiment, the electronic device 200 may include a flexible display 230 disposed to be supported by the first housing 210 and the second housing 220. According to yet another embodiment, the flexible display 230 may include a flat portion supported by the second housing 220, and a bendable portion extending from the flat portion and supported by the first housing 210. According to yet another embodiment, the bendable portion of the flexible display 230 may be disposed in the first space of the first housing 210 not to be exposed to the outside when the electronic device 200 is closed, and may be exposed to the outside to extend from the flat portion while being supported by the first housing 210 when the electronic device 200 is open. Accordingly, the electronic device 200 may be a rollable-type electronic device in which a display screen of the flexible display 230 is expanded in response to an opening action according to a movement of the first housing 210 from the second housing 220.

According to yet another embodiment, in the electronic device 200, the first housing 210 may be at least partially inserted into the second space of the second housing 220, and may be coupled to be movable in direction W. For example, in the closed state, the electronic device 200 may be maintained in a state in which the first housing 210 and the second housing 220 are coupled such that a distance between the first side surface 2121 and the fourth side surface 2221 is a first distance d1. According to yet another embodiment, in the open state, the electronic device 200 may be maintained in a state in which the first housing 210 protrudes from the second housing 220 to have a second interval distance d in which the first side surface 2121 protrudes from the fourth side surface 2221 by a predetermined distance d2. According to yet another embodiment, the flexible display 230 may be supported by the first housing 210 and/or the second housing 220 such that both ends thereof have curved edges, in the open state.

According to yet another embodiment, the electronic device 200 may automatically transition between the open state and the closed state by operation of a driving unit disposed in the first space and/or the second space. For example, a processor (e.g., the processor 120 of FIG. 1) of the electronic device 200 may be configured to control an operation of the first housing 210 using the driving unit when an event for a transition between the open state and the closed state of the electronic device 200 is detected. According to yet another embodiment, the first housing 210 may manually protrude from the second housing 220 as a result of manipulation by a user. In this example, the first housing 210 may protrude by a protrusion amount desired by the user, and thus, a screen of the flexible display 230 may vary in size and have various display areas. Accordingly, the processor (e.g., the processor 120 of FIG. 1) of the electronic device 200 may display an object in various ways in response to a display area corresponding to a predetermined amount by which the first housing 210 protrudes, and may control the electronic device 200 to execute an application program.

According to yet another embodiment, the electronic device 200 may include at least one of an input device 203, sound output devices 206 and 207, sensor modules 204 and 217, camera modules, i.e., first camera device 205 and second camera device 216, a connector port 208, a key input device (not shown), or an indicator (not shown). According to yet another embodiment, at least one of the above-described components of the electronic device 200 may be omitted, or the electronic device 200 may further include other components.

According to yet another embodiment, the input device 203 may include a microphone 203. According to yet another embodiment, the input device 203 may include a plurality of microphones 203 arranged to sense a direction of sound. The sound output device 206 and 207 may include speakers 206 and 207. The speakers 206 and 207 may include an external speaker 206 and a phone call speaker 207. According to yet another embodiment, when an external speaker 206' is disposed in the first housing 210, sound may be output through a speaker hole 206 formed in the second housing 220, in the closed state. According to yet another embodiment, the microphone 203 or the connector port 208 may be formed to have substantially the same configuration. According to yet another embodiment, the sound output devices 206 and 207 may include a speaker (e.g., a piezo speaker) that operates without a separate speaker hole 206.

According to yet another embodiment, the sensor modules 204 and 217 may generate an electrical signal or a data value corresponding to an internal operating state of the electronic device 200 or an external environmental state. The sensor modules 204 and 217 may include, for example, a first sensor module 204 (e.g., a proximity sensor or an illuminance sensor) disposed on a front surface of the second housing 220, and/or a second sensor module 217 (e.g., a heart rate monitoring (FIRM) sensor) disposed on a rear surface of the second housing 220. According to yet another embodiment, the first sensor module 204 may be disposed below the flexible display 230 in the second housing 220. According to an example embodiment, the first sensor module 204 may further include at least one of a proximity sensor, an illuminance sensor (i.e., first sensor module 204), a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to yet another embodiment, the camera devices 205 and 216 may include a first camera device 205 disposed on the front surface of the second housing 220 of the electronic device 200, and a second camera device 216 disposed on the rear surface of the second housing 220. According to yet another embodiment, the electronic device 200 may include a flash 218 located near the second camera device 216. According to yet another embodiment, the camera devices 205 and 216 may include one or more lens, an image sensor, and/or an ISP. According to yet another embodiment, the first camera device 205 may be disposed under the flexible display 230, and may be configured to capture an object through a portion of an active area of the flexible display 230. According to yet another embodiment, the flash 218 may include, for example, a light-emitting diode (LED) or a xenon lamp. In some embodiments, two or more lenses (e.g., a wide-angle lens and a telephoto lens) and image sensors may be disposed on one surface of the electronic device 200.

According to yet another embodiment, the electronic device 200 may include at least one antenna (not shown). According to yet another embodiment, the at least one antenna may wirelessly communicate with an external electronic device (e.g., the external electronic device 104 of FIG. 1), or may wirelessly transmit and receive power required for charging. According to yet another embodiment, the antenna may include a legacy antenna, a mmWave antenna, a near field communication (NFC) antenna, a wireless charging antenna, and/or a magnetic secure transmission (MST) antenna. According to yet another embodiment, an antenna structure may be formed through at least a portion of the first side frame 212 and/or the second side frame 222, which are formed of metal.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. The electronic device according to an embodiment of the disclosure is not limited to those described above.

It should be understood that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to yet another embodiment, the module may be implemented in a form of an application-predetermined integrated circuit (ASIC).

Embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to yet another embodiment, each component (e.g., a module or a program) of the above-described components may include a single entity or multiple entities, and some of the multiple entities may be separately disposed in different components. According to yet another embodiment, one or more of the above-described components may be omitted, or one or more other components may be added. Alternatively or additionally, a plurality of components (e.g., modules or programs) may be integrated into a single component. In such a case, according to yet another embodiment, the integrated component may still perform one or more functions of each of the plurality of components in the same manner or in a similar manner as they are performed by a corresponding one of the plurality of components before the integration. According to o yet another e embodiment, operations performed by the module, the program, or another component may be carried out sequentially, in parallel, repeatedly, or heuristically, or one or more of the operations may be executed in a different order or omitted, or one or more other operations may be added.

Figure 4:
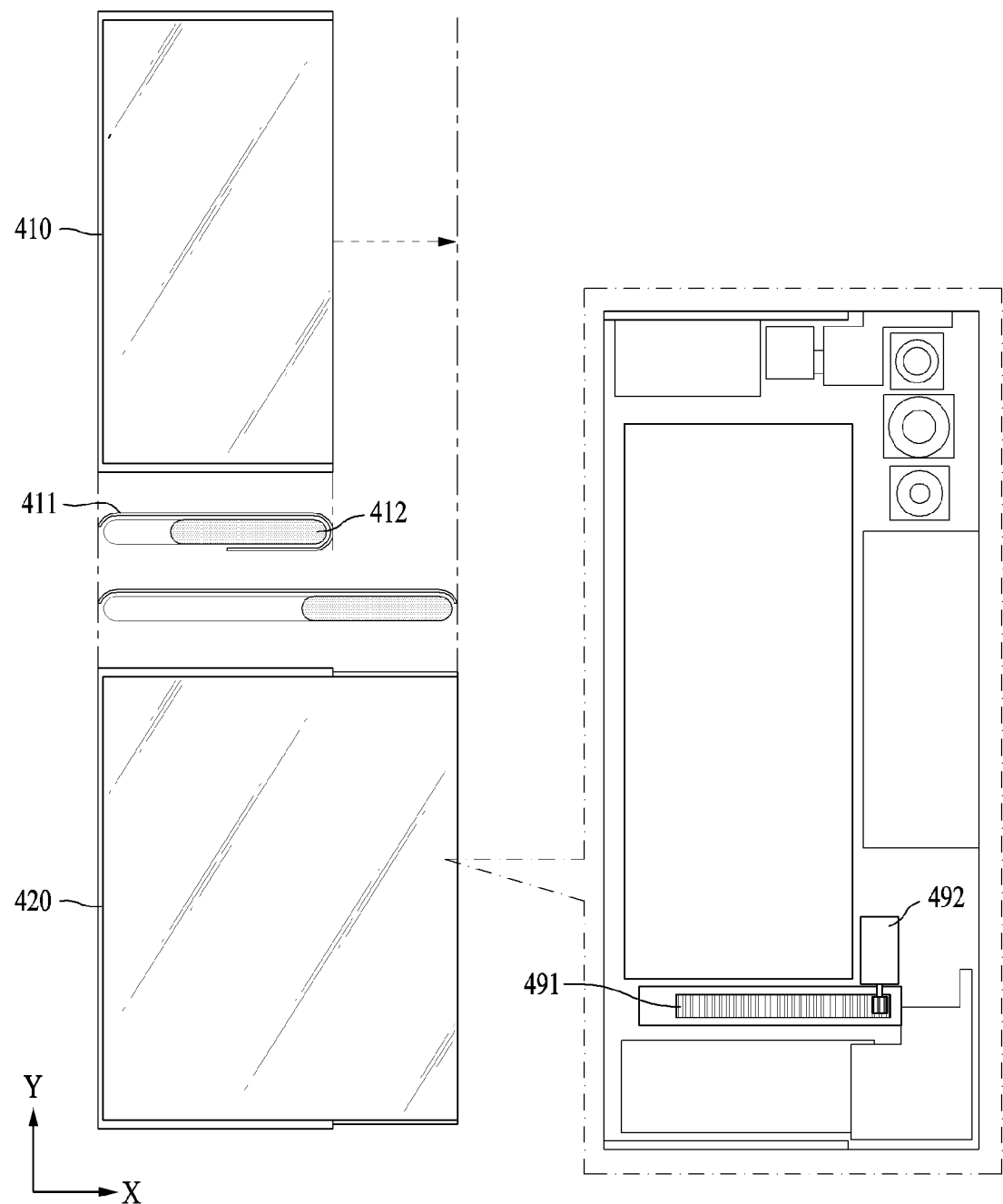
FIG. 4 is a diagram illustrating a change in the size of a display screen of an electronic device according to an embodiment of the disclosure.

FIG. 4 is a diagram illustrating a change in the size of a display screen of an electronic device according to an embodiment of the disclosure.

Referring to FIG. 4, a display module (e.g., the display module 160 of FIG. 1) of an electronic device 400 (e.g., the electronic device 101 of FIG. 1) according to one embodiment may include a display screen having a variable aspect ratio. The display screen may be a screen of a viewable portion viewed from one side (e.g., a side where the user is located) among the screens of the display module. In the disclosure, the electronic device 400 of a rollable-type in which a display screen is expanded in response to an opening action according to a movement of an actuator 412 (e.g., the first housing 210 of FIGS. 2A, 2B, 3A, and 3B) is mainly described. In the disclosure, an example in which the electronic device 400 is a rollable-type device is mainly described, but the type is not limited thereto, and the electronic device 400 may have one of various flexible form factors that allow the size of the display screen to be changed.

The display module of the electronic device 400, which is a rollable-type device, may have a ⊂-shaped or ⊃-shaped curved form when viewed from one side. As the actuator 412 connected to the display module may move in a first direction, a curved portion of a screen of the display module may be pushed out in the first direction, and the display screen may be expanded. For example, as illustrated in FIG. 4, the actuator 412 may move in the first direction on a reduced display screen 411 of the electronic device 410. As the curved portion of the display module is unfolded by the movement of the actuator 412 in the first direction, the display screen of the electronic device 420 may be expanded. On the contrary, as the actuator 412 moves in the second direction, the curved portion may be pulled in the second direction, and thus the display screen may be reduced.

According to another embodiment, the display module of the electronic device 400 may increase or decrease the size of the display screen by driving a motor. For example, the electronic device 400 may change the size of the display screen by driving a motor 492 included in the electronic device 400 to move the actuator 412 along a slide rail 491. However, the example is not limited thereto, and the actuator 412 of the electronic device 400 may be manually moved by an external force (e.g., gripping the actuator 412, a user applies force to move the actuator 412).

Referring again to FIG. 4, a length (e.g., a vertical length as a y-axis length) along one axis (e.g., a y-axis) of the display module may be fixed, and a length (e.g., a horizontal length as an x-axis length) along the other axis (e.g., an x-axis) may be changed by expanding and reducing the display. Since the length along the other axis may be changed while the length along the one axis is fixed, the aspect ratio of the electronic device 400 may be changed by the above-mentioned change in the screen size of the display screen.

Figure 5:
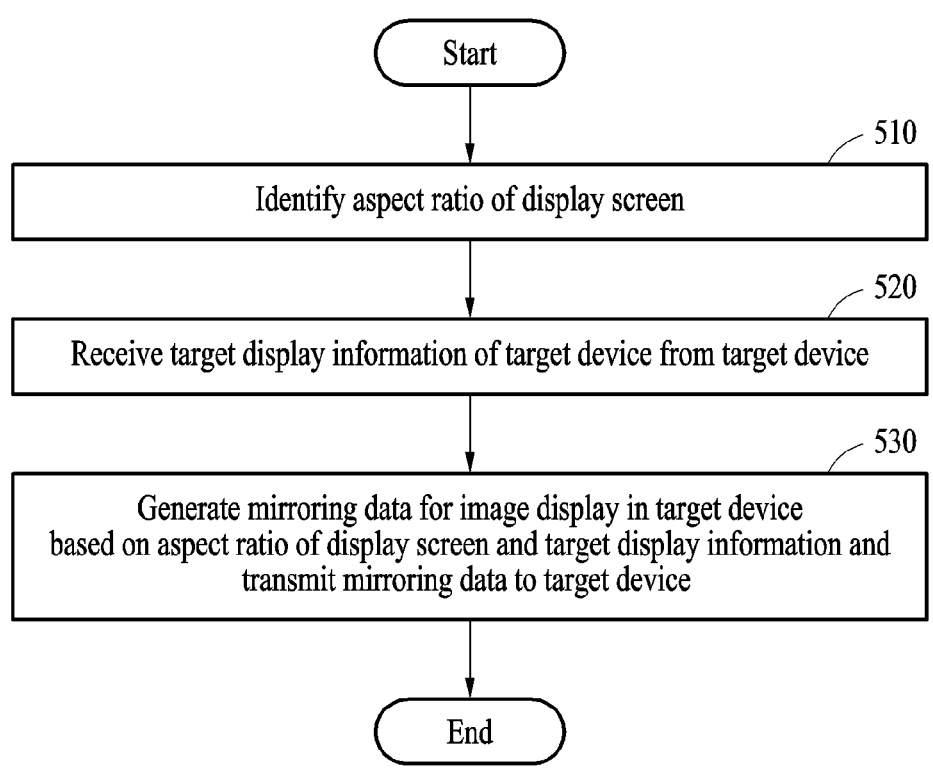
FIG. 5 is a flowchart illustrating a mirroring operation according to an embodiment of the disclosure.

FIG. 5 is a flowchart illustrating a mirroring operation according to an embodiment of the disclosure.

Referring to FIG. 5, in operation 510, an electronic device (e.g., the electronic device 101 of FIG. 1) may identify an aspect ratio of a display screen. For example, the electronic device may identify a ratio of a length (e.g., a vertical length as a y-axis length) along a first axis (e.g., a y-axis) against a length (e.g., a horizontal length as an x-axis length) along a second axis (e.g., an x-axis) of the display screen (e.g., an x-axis) as the aspect ratio. When the length along the y-axis is fixed, the electronic device may monitor a change in the length along the x-axis to determine the aspect ratio (e.g., 4:3) based on a ratio of the length (e.g., y-axis length=vertical length=3a) along the y-axis against the length (e.g., x-axis length=horizontal length=4a) along the x-axis. In this example, "a" may be a real number greater than or equal to "0". However, the aspect ratio is not limited thereto, and it may also be expressed as a resolution (e.g., 1024×768 pixels) indicating the number of pixels disposed along each axis of the screen.

In operation 520, the electronic device may receive target display information of the target device from the target device using the communication module. The target display information may include at least one of a resolution and an aspect ratio of a target display included in the target device. For example, the target display information may also include a resolution (e.g., the number of pixels) corresponding to an x-axis length (e.g., a width as a horizontal length) of the target display.

In operation 530, the electronic device may generate mirroring data for image display in the target device based on the aspect ratio of the display screen and the target display information and transmit the mirroring data to the target device using the communication module. The generation and transmission of the mirroring data will be described below with reference to FIGS. 6 to 18.

The mirroring data may be used for a mirroring operation transmitted from the electronic device to the target device, and may include, for example, a mirroring image output from the target device. For example, the mirroring image may be an image composed of an image corresponding to a content area merged with an image corresponding to a margin area (e.g., an additional information area). The content area may indicate an area in which an application and content output from the display module of the electronic device are displayed. The margin area may indicate a remaining area other than the content area in the mirroring image. The target device that receives the mirroring data may mirror the image output from the display module of the electronic device by outputting the same image as the image displayed through the display module of the electronic device in the content area. The electronic device may adjust a size (e.g., a width) of the content area and the margin area based on the above-described aspect ratio of the display screen and target display information, or may determine information to be included in the margin area.

The mirroring data is not limited to include only the mirroring image composed of the content area image merged with the margin area image, and may also include data (e.g., screen transfer rate, time information of the mirroring image output from each device, the width of the content area, coordinates at which a reference point of the content area is fixed, and/or the width of the margin area) required for mirroring and/or data (e.g., device status information, notification information, and/or mirroring information) accompanying the mirroring. For example, the mirroring image may include an image corresponding to the content area, and the mirroring data may include data (e.g., the width of the content area, coordinates at which the reference point of the content area is fixed, and/or the width of the margin area) required for mirroring together with the mirroring image.

During a mirroring operation, the electronic device according to one embodiment may provide various information in the margin area even if the margin area is included in the mirroring data, which will be described below with reference to FIGS. 6 to 8. The electronic device may improve information transfer efficiency within a limited screen size via the margin area.

In addition, the electronic device may output mirroring data from the electronic device and the target device without interruption in response to a change in the screen size during mirroring. The electronic device may provide a stable and consistent user experience by fixing the reference point of the content area in the mirroring data to one side or to the central axis. The electronic device may provide extended control optimized for a target device to be mirrored and a seamless mirroring experience.

The electronic device may reduce or remove the margin area included in the mirroring data according to a setting. The electronic device may reduce screen tearing in a display module of one of the electronic device and the target device by matching the aspect ratio of the electronic device to the aspect ratio of the target display based on the target display information of the target device.

Figure 6:
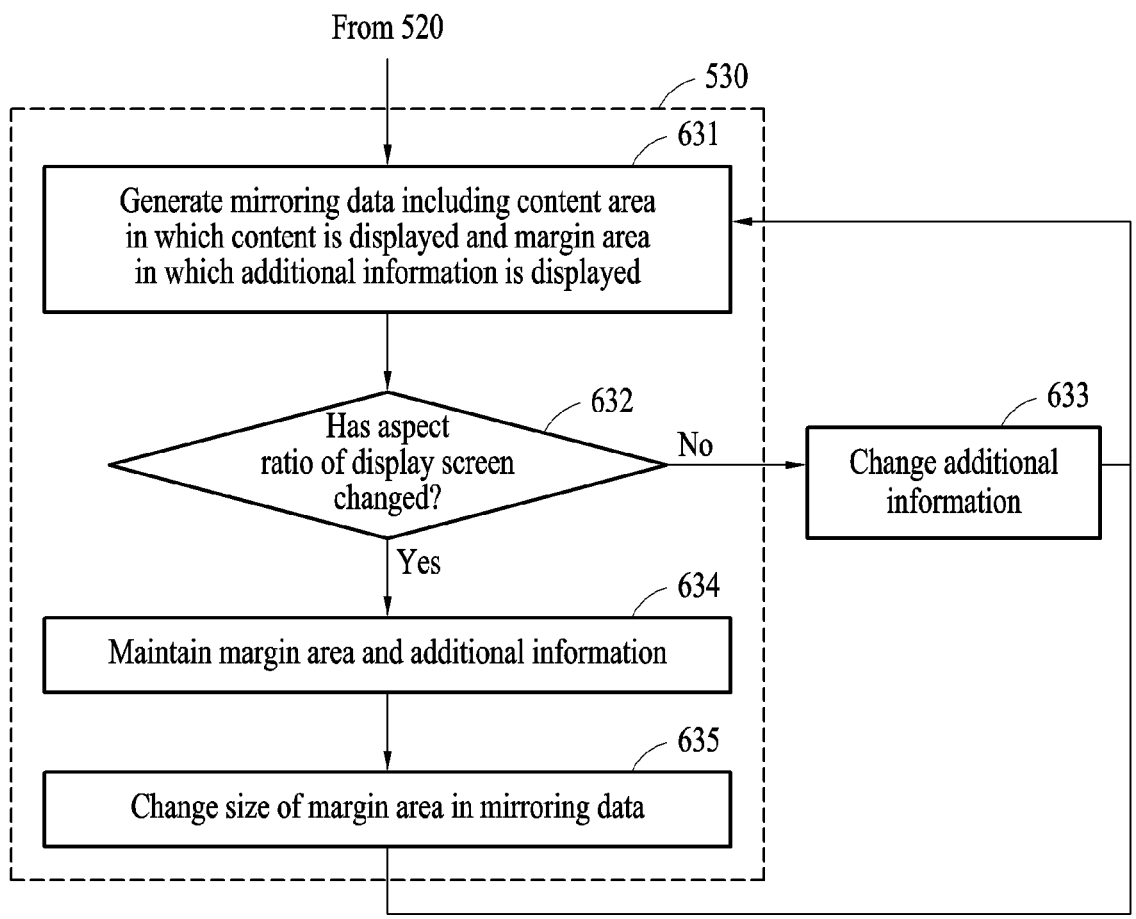
FIGS. 6 and 7 are diagrams illustrating information being provided in a margin area according to various embodiments of the disclosure.
Figure 7:
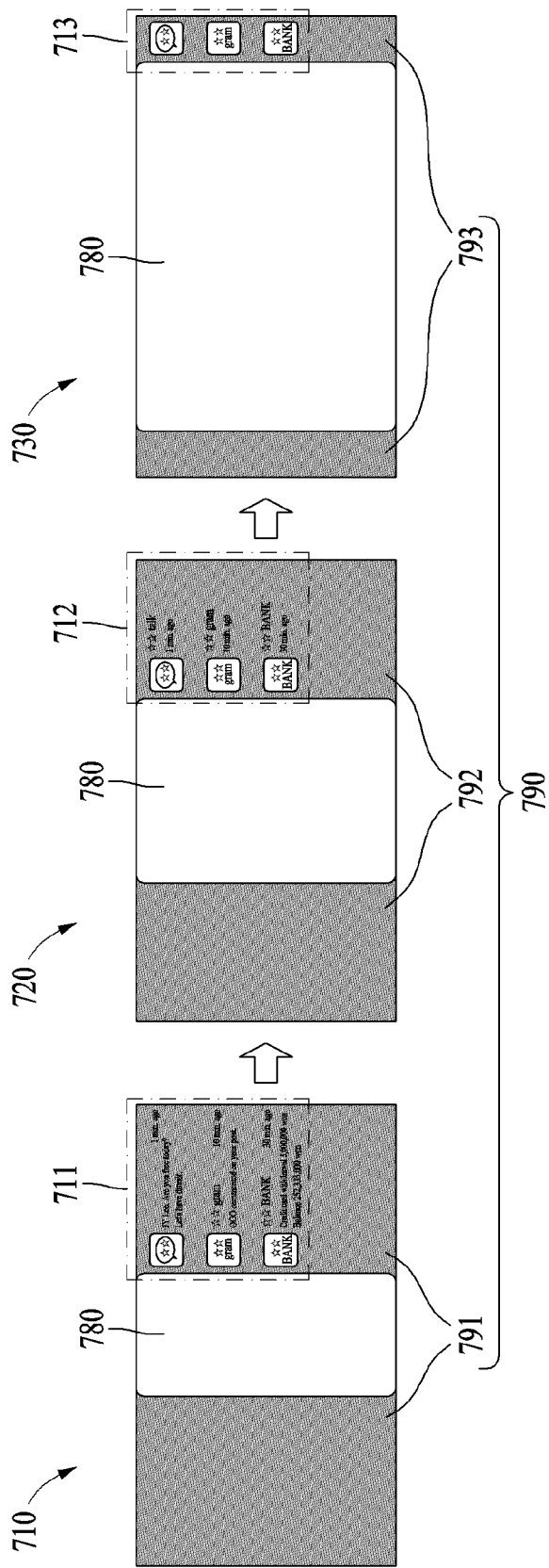

FIGS. 6 and 7 are diagrams illustrating information being provided in a margin area according to various embodiments of the disclosure.

Referring to FIGS. 6 and 7, an electronic device (e.g., the electronic device 101 of FIG. 1) according to one embodiment may generate mirroring data including information in a margin area 790, and may change a size, amount, and/or graphic representation of the information included in the margin area 790 according to a change in size of the margin area 790.

In operation 631, the electronic device may generate mirroring data including a content area 780 in which content may be displayed and the margin area 790 in which additional information is displayed. The additional information may include at least one of device status information, notification information, mirroring information, and auxiliary information. Examples of the additional information will be described below with reference to FIG. 8.

In the mirroring data, the content area 780 and the margin area 790 may be determined based on an aspect ratio of a display screen of a display module (e.g., the display module 160 of FIG. 1) and target display information. For example, when the aspect ratio of the display screen is different from an aspect ratio of the target display information, the electronic device may generate mirroring data including the content area 780 and the margin area 790 that have the aspect ratio of the display screen. A mirroring image of the mirroring data in which images of the content area 780 and the margin area 790 are integrated may have the aspect ratio of the target display information. For example, when a ratio (e.g., the aspect ratio of the display screen, 9:19) of a length (e.g., a vertical length as a y-axis length) along a first axis against a length (e.g., a horizontal length as an x-axis length) along a second axis of the display screen of the electronic device is smaller than a ratio (e.g., the aspect ratio of the target display, 16:9) of a length along a y-axis (e.g., a vertical length) against a length along an x-axis (e.g., a horizontal length) of the target display in the target display information of the target device, the margin area 790 may be located on both sides of the content area 780. In other words, when a mirroring image of a smartphone in a portrait mode is output from a TV, the mirroring data may include the margin area 790 located on both sides of the content area 780. However, the example is not limited thereto, and the margin area 790 may be located above and below the content area 780 when the smartphone is in a landscape mode or the target display has a vertically elongated shape. However, for convenience of explanation, in FIG. 6, an example of a mirroring image in which the margin area 790 is located on both sides of the content area 780 with respect to a central axis parallel to the y-axis (e.g., a vertical axis as the first axis) is mainly illustrated.

In operation 632, the electronic device may monitor a change in the aspect ratio of the display screen. For example, an electronic device (e.g., a rollable-type electronic device) having a flexible display may change the aspect ratio by one of expanding or reducing the screen as described above. When there is no change in the aspect ratio, in operation 633, the electronic device may maintain the margin area 790 of the mirroring data generated in operation 631 and the additional information being output in the corresponding margin area 790.

In operation 634, the electronic device may change the size of the margin area 790 in the mirroring data based on a change in the aspect ratio of the display screen. When a screen length along the second axis (e.g., the horizontal axis as the x-axis) of the display screen increases due to the expansion of the display module, the electronic device may increase a component value corresponding to the second axis in the aspect ratio of the display screen. Accordingly, the electronic device may increase the width of the content area 780 and decrease the size (e.g., the width) of the margin area 790 in the mirrored image. For example, when the screen length along the second axis of the display screen decreases due to the reduction of the display module, the electronic device may decrease the component value corresponding to the second axis in the aspect ratio of the display screen. Accordingly, the electronic device may reduce the width of the content area 780 and increase the size (e.g., the width) of the margin area 790 in the mirrored image.

In operation 635, the electronic device may change the additional information based on a change in the size of the margin area 790 in the mirroring data. For example, the rollable-type electronic device may change at least one of a size, an amount, and a graphic representation of the additional information based on the change in the size of the margin area 790.

According to another embodiment, the electronic device may determine a display area allocated to the additional information based on the size of the margin area 790. The electronic device may decrease the display area allocated to the additional information based on a decrease in the size of the margin area 790. The electronic device may increase the display area allocated to the additional information based on an increase in the size of the margin area 790. Referring to FIG. 7, the electronic device having a display screen of a first size before expansion may generate first mirroring data 710 including additional information in a first display area 711 of the margin area 790. The electronic device having a display screen of a second size greater than the first size described above may generate second mirroring data 720 including additional information in a second display area 712 of the margin area 790. The electronic device having a display screen of a third size in which the display screen is fully expanded and includes the size, amount, and graphic representation of the additional information may generate third mirroring data 730 including additional information in a third display area 713 of the margin area 790. The third display area 713 may be smaller than the second display area 712, and the second display area 712 may be smaller than the first display area 711. Accordingly, the electronic device may increase or decrease the additional information of the mirroring data 710, 720, and 730 output from the target display according to the size of the margin area 790.

In addition, the electronic device may change the additional information based on an amount of change in size of the margin area 790 exceeding a predetermined threshold change amount. The amount of change in size may be an amount that is smaller or greater than the size of the margin area 790, and may be, for example, an absolute value of a difference (e.g., an area difference or an x-axis length difference) in size between the margin region before the change and the margin region after the change. In the above-described example, when a second margin area 792 reduced by the threshold change amount compared to a first margin area 791 of the first mirroring data 710 generated based on the display screen before expansion is detected, the electronic device may change an area in which the additional information is displayed from the first display area 711 to the second display area 712. When the amount of change in the size from the first margin area 791 to the second margin area 792 exceeds the threshold change amount, the electronic device may display the additional information in the second display area 712. Similarly, when a third margin area 793 is reduced by the threshold change amount compared to the second margin area 792 of the second mirroring data 720 is detected, the electronic device may change an area in which the additional information is displayed from the second display area 712 to the third display area 713. In other words, whenever the size of the margin area 790 changes by the threshold change amount, the electronic device may gradually change the size of the area in which the additional information is displayed. In addition, the electronic device may gradually change the amount and graphic representation of the additional information as well as the size of the area in which the additional information is displayed.

When the size of the margin area 790 is smaller than a minimum size, the electronic device according to yet another embodiment may remove the additional information from the mirroring data. The minimum size may be a size of an area required for the display of icons (e.g., icons representing time, signal strength, remaining battery power, application notifications, and/or icons related to mirroring) representing items of the additional information. Accordingly, when the size of the margin area 790 is smaller than the minimum size required for displaying an icon, the electronic device may not to provide the additional information.

Figure 8:
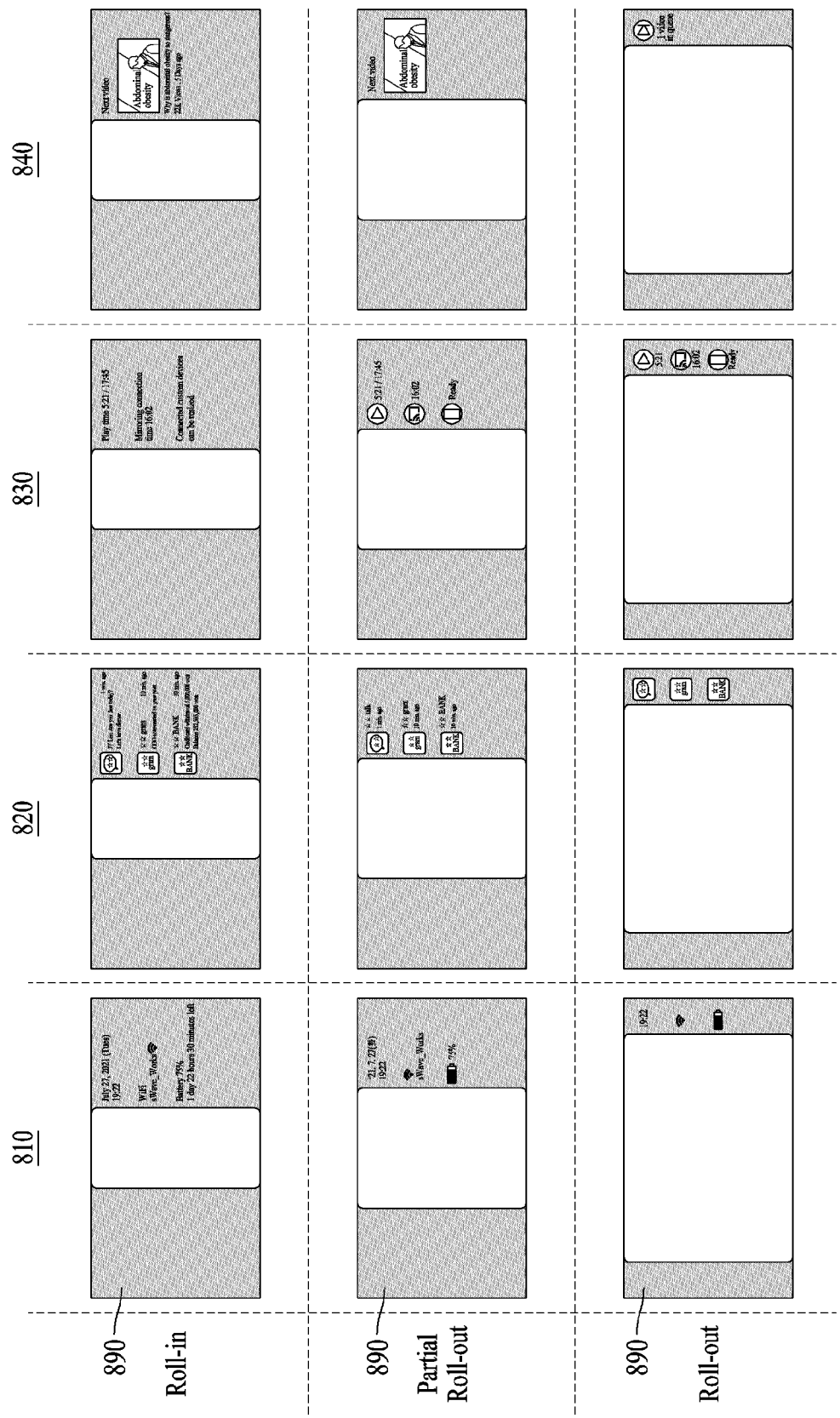
FIG. 8 is a diagram illustrating information provided in a margin area according to an embodiment of the disclosure.

FIG. 8 is a diagram illustrating information provided in a margin area according to an embodiment of the disclosure.

Referring to FIG. 8, as described above, the additional information may include at least one of device status information 810, notification information 820, mirroring information 830, and auxiliary information 840. The electronic device may include one of the device status information 810, the notification information 820, the mirroring information 830, and the auxiliary information 840 in the margin area 890, or may include information that is a combination of two or more of the aforementioned types of information in the margin area 890, according to a setting. Referring to FIG. 8, for convenience of explanation, individual information is described according to each size of the display screen of the electronic device. A minimum screen size in FIG. 8 may be a size of the display screen when the electronic device is not expanded (e.g., a roll-in state). A maximum screen size may be a size of the display screen when the electronic device is expanded to the maximum (e.g., a roll-out state). An intermediate screen size may be the size of the display screen between the minimum screen size and the maximum screen size when the electronic device is partially expanded (e.g., a partial roll-out state).

The device status information 810 may be information indicating a status of the device, for example, time information of the electronic device, communication information (e.g., connected Wi-Fi network and communication type), and/or battery information (e.g., remaining battery amount, estimated available time). When the screen size of the electronic device is the minimum screen size, the electronic device may include time information in time notation fully indicating year, month, day, day of the week, and time, communication information including a communication type and network name, and/or battery information indicating estimated available time and remaining battery amount in the mirroring data. When the screen size of the electronic device is the intermediate screen size, the electronic device may include time information of a summarized time notation, communication information including a network name and communication strength, and/or battery information indicating a remaining battery amount and an icon showing the remaining amount in the mirroring data. When the screen size of the electronic device is the maximum screen size, the electronic device may include at least one of time information indicating only hours and minutes, a communication icon, or a battery icon as additional information in the mirroring data.

The notification information 820 may be information indicating a notification message received from an application installed in the electronic device, for example, at least one of a notification for a message received in a messenger application, a notification received in a social network service application, or a notification received in a financial application. When the screen size of the electronic device is the minimum screen size, the electronic device may include the notification content of each application and the time at which the notification is received as additional information in the margin area 890. When the screen size of the electronic device is the intermediate screen size, the electronic device may include the time at which a notification of each application is generated as additional information in the margin area 890. When the screen size of the electronic device is the maximum screen size, the electronic device may include only the icon of each application in which the notification has occurred as additional information in the margin area 890.

The mirroring information 830 may be information related to a mirroring operation, and may include, for example, a playback time of a video in the mirroring operation, a connection time of the mirroring, and/or a function (e.g., automatic screen alignment) available in the mirroring. When the screen size of the electronic device is the minimum screen size, the electronic device may include additional information representing each item of the mirroring information 830 as text in the mirroring data. When the screen size of the electronic device is the intermediate screen size, the electronic device may include additional information representing each item of the mirroring information 830 as an icon in the mirroring data. When the screen size of the electronic device is the maximum screen size, the electronic device may include each item of the mirroring information 830 in the mirroring data as a minimized graphic representation.

The auxiliary information 840 may be information that is supplementarily provided in the contents of an application being executed in the mirroring operation. When the screen size of the electronic device is the minimum screen size, the electronic device may include a thumbnail and a description of a video to follow a currently playing video as additional information in the mirroring data. When the screen size of the electronic device is the intermediate screen size, the electronic device may include only a thumbnail for a video to be played next in the mirroring data. When the screen size of the electronic device is the maximum screen size, the electronic device may only include the information of a queue of videos to be played next, in the mirroring data.

The additional information shown in FIG. 8 is merely an example and is not limited thereto, and when the screen size of the electronic device is the maximum screen size, the electronic device may include additional information of a minimum amount and size compared to the amount and size of other screens in the mirroring data.

Figure 9:
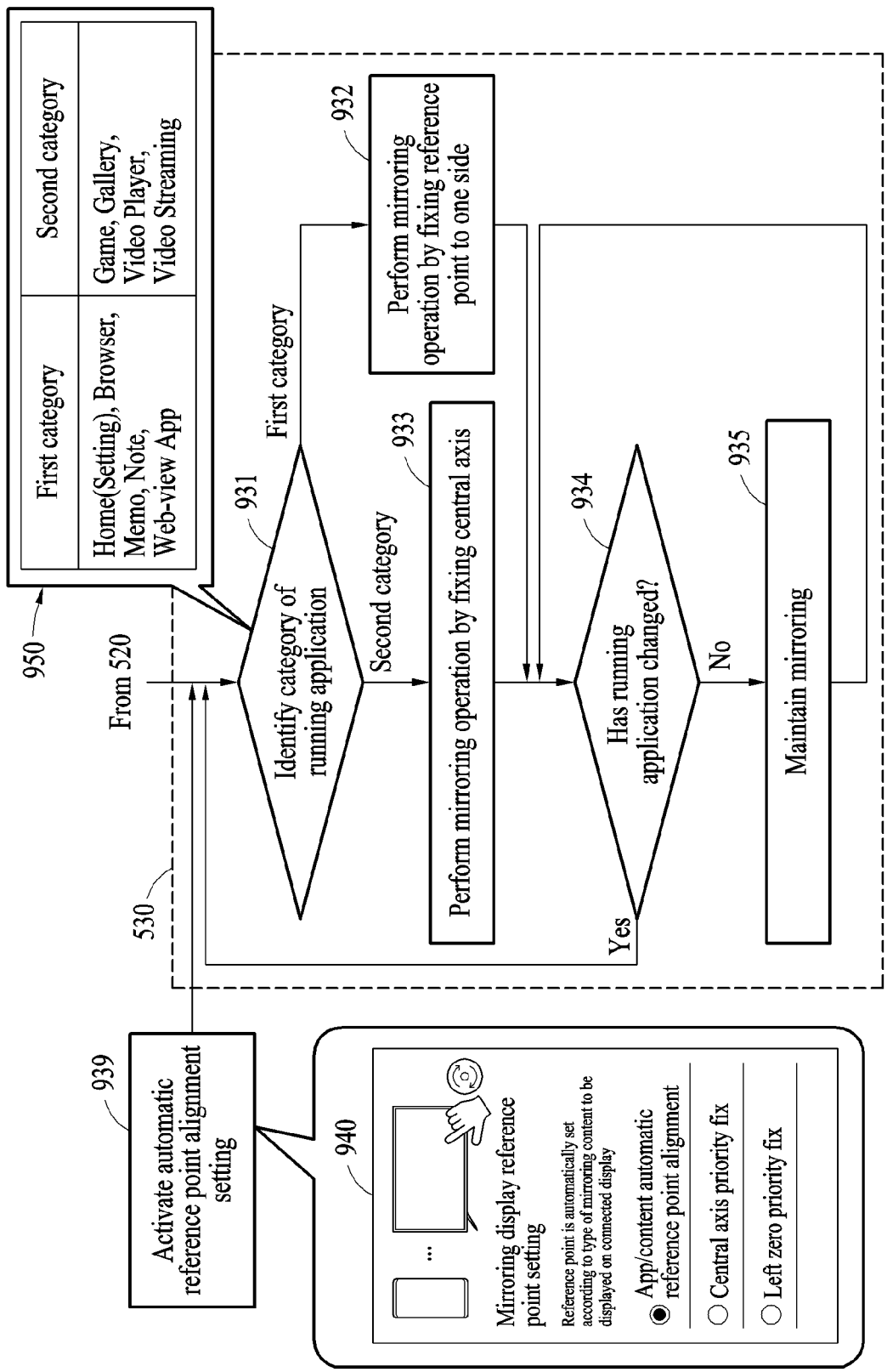
FIGS. 9 and 10 are diagrams illustrating reference point mapping for each category of an application according to various embodiments of the disclosure.
Figure 10:
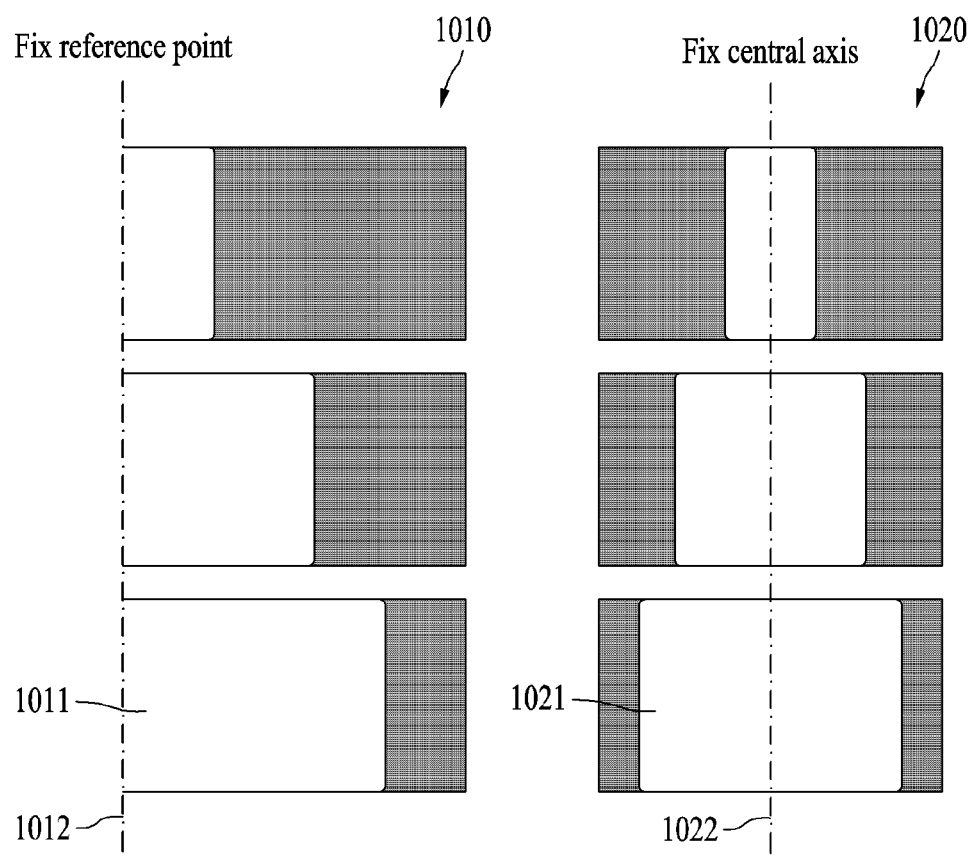

FIGS. 9 and 10 are diagrams illustrating reference point mapping for each category of an application according to various embodiments of the disclosure.

The electronic device (e.g., the electronic device 101 of FIG. 1) according to one embodiment may determine a reference point (e.g., a zero point or a central axis) of mirroring to be displayed on a target display based on an attribute 950 of a mirrored application. The reference point of a content area and a point at which the reference point is fixed may vary according to the attribute 950 of the application. The electronic device may display an application in the content area that is changed in real time according to a size of a display screen based on the reference point. The attribute 950 of an application may be identified based on a category of the application. The attribute 950 of the application may be classified into, for example, a first category and a second category, which will be described below with reference to operation 931.

In operation 939, the electronic device may activate an automatic reference point alignment setting. For example, the electronic device may activate a function for performing automatic alignment of reference points for each category of application and/or content based on a user input in a mirroring display reference point setting interface 940.

In operation 931, the electronic device may identify a category of a running application. For example, the electronic device may identify a running application as one of the first category and the second category. The first category may be a category including an application that increases an amount of content or provides additional content for screen expansion. In other words, when an extension of the display screen is detected, a first application belonging to the first category may provide additional content in addition to the content displayed before the extension occurred. The first application of the first category may include, for example, a home screen, a browser application, a memo application, a note application, and/or a web view application. The second category may be a category including an application of which an area occupied by content increases as the screen expands. In other words, when an extension of the display screen is detected, a second application belonging to the second category may enlarge and provide the content itself displayed before the extension occurred. The second application of the second category may include, for example, a game application, a gallery application, a video player, and/or a video streaming application.

In operation 932, when a running application is identified as belonging to the first category, the electronic device may perform a mirroring operation by fixing a reference point of the content area to one side of the target display. For example, when mirroring data is generated for the first application of the first category, the electronic device may fix a reference point of a content area in which the first application is displayed in the mirroring data for the first application, based on the target display information. The electronic device may determine, in the mirroring data for the first application, one or more point at which one or more reference point of the content area is fixed, based on a maximum expansion size of the display module and the target display information. For example, a point at which the reference point of the content area is fixed may be determined so that the content area of the maximum extension size may be aligned with the center of the target display. The fixing of the reference point in the mirroring operation for the first application will be further described below with reference to FIGS. 11 and 12. An example of an electronic device 1010 mirroring the first application and fixing reference points 1012 of a content area 1011 to points corresponding to one edge (e.g., a left edge) of a target display during screen expansion is illustrated in FIG. 10.

In operation 933, when a running application is identified as belonging to the second category, the electronic device may perform a mirroring operation by fixing a central axis of the content area to a central axis of the target display. Referring to FIG. 9, a central axis is described as being parallel to a y-axis (e.g., a vertical axis), as an example, but is not limited thereto, and central axes parallel to an x-axis (e.g., a horizontal axis) may be mapped to each other according to an expansion direction of the display. When mirroring data is generated for the second application of the second category, the electronic device may map a central axis of a content area in which the second application is displayed in the mirroring data for the second application to the central axis of the target display of a target device, based on the target display information. The mapping between the central axes in the mirroring operation for the second application will be further described below with reference to FIG. 13. An example of an electronic device 1020 mirroring the second application and fixing reference points corresponding to a central axis 1022 of a content area 1021 to points corresponding to a central axis of the target display during screen expansion is illustrated in FIG. 10.

In operation 934, the electronic device may monitor whether the running application is changed to another application. In operation 935, while the running application continues to be the running application, the electronic device may continue mirroring. When the running application is changed to another application, the electronic device may perform operation 931 again and identify the category of the newly executed application.

The electronic device according to another embodiment may include a display module having a variable display screen, and fix a reference point of an application when a size of the display screen of the display module is changed, to maintain content immersion and concentration, and prevent dizziness from occurring.

Figure 11:
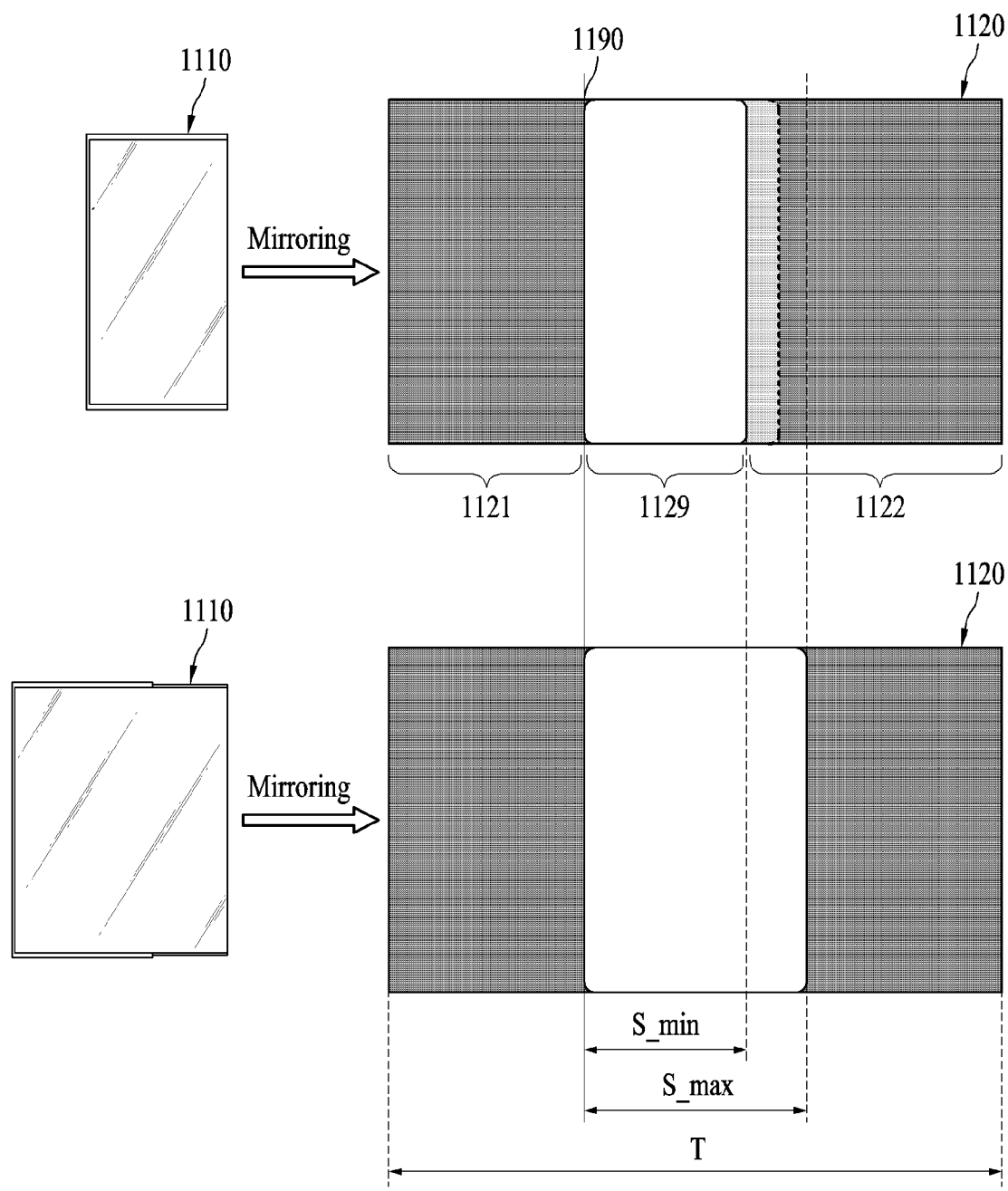
FIGS. 11, 12, and 13 are diagrams illustrating fixing of a reference point in mirroring according to various embodiments of the disclosure.
Figure 12:
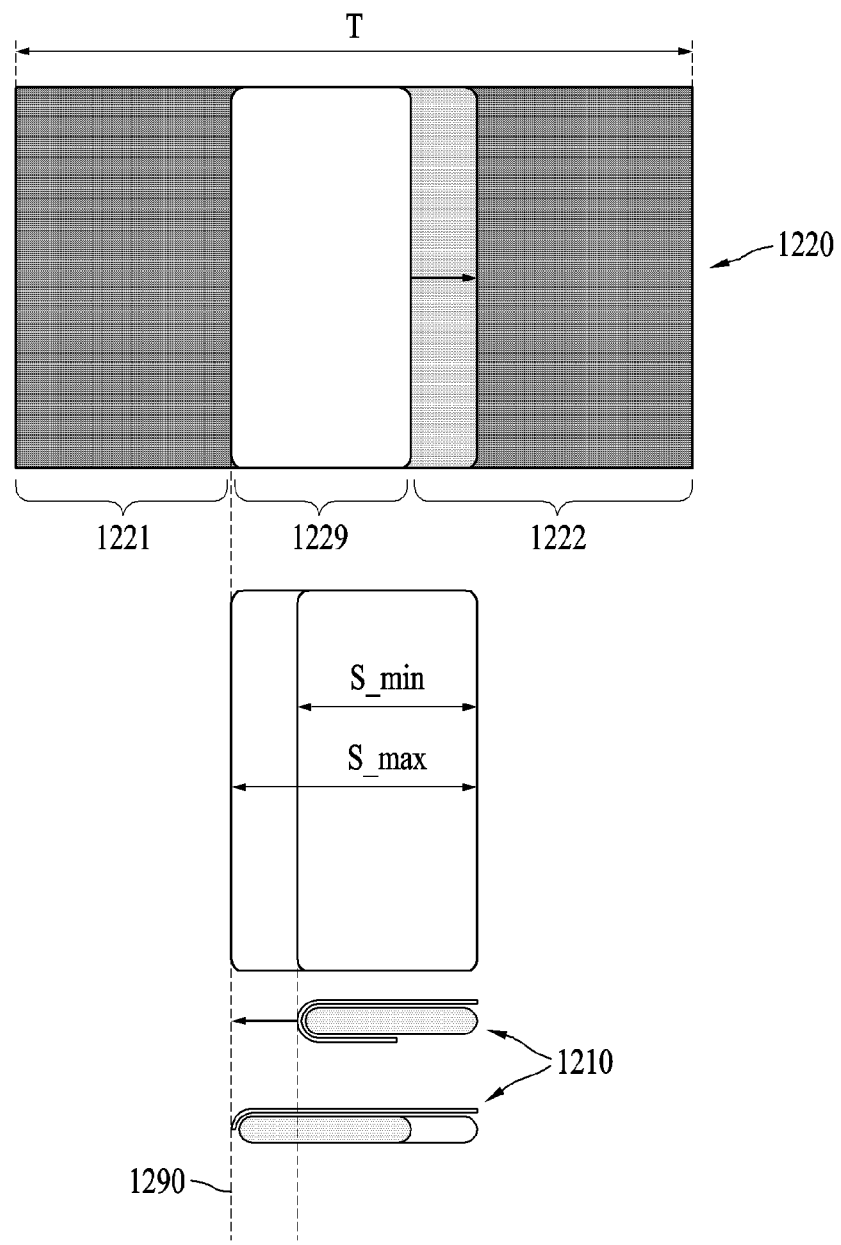
Figure 13:
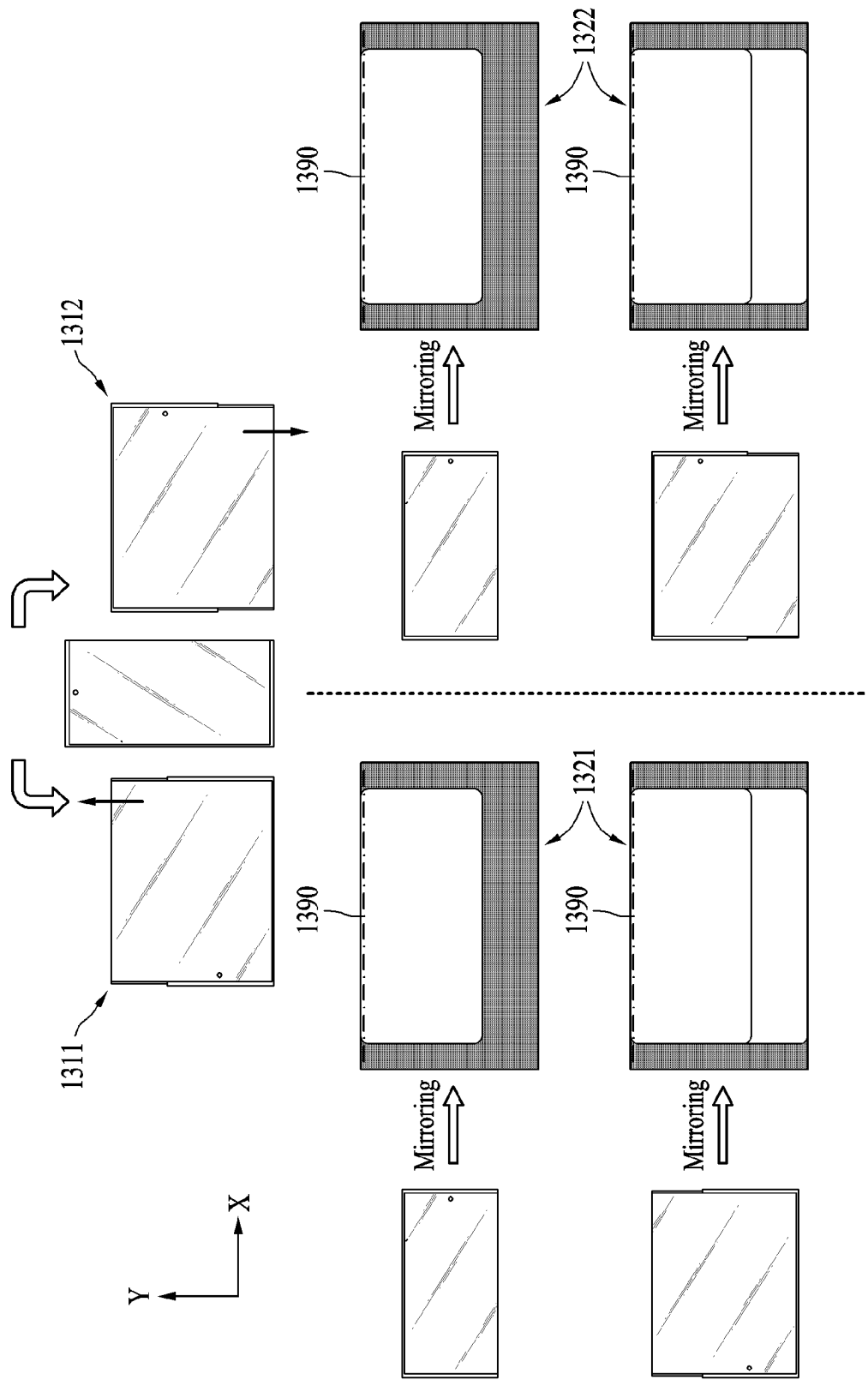

FIGS. 11, 12, and 13 are diagrams illustrating fixing of a reference point in mirroring according to various embodiments of the disclosure.

Referring to FIGS. 11, 12 and 13, an electronic device 1110 (e.g., the electronic device 101 of FIG. 1) according to one embodiment may determine a content area 1129 corresponding to an aspect ratio of a display screen of the electronic device 1110 in mirroring data generated based on target display information, and may determine a remaining area as a margin area. The electronic device 1110 may fix a reference point of the content area 1129 even when a size of the display screen is changed by arranging the margin area on both sides of the content area 1129 based on a maximum extended width of the display screen. In the disclosure, a width may not be a physical width of the display, but may be a width of an area in which a display module of the electronic device 1110 and an axis (e.g., a vertical axis as a y-axis) of the target display 1120 are adjusted to the same scale. For example, a width of the content area 1129 corresponding to the display screen of the electronic device 1110 may be an x-axis resolution (e.g., a horizontal resolution, being the number of pixels arranged along a horizontal axis corresponding to the x-axis) based on a y-axis resolution (e.g., a vertical resolution) among resolutions of the target display 1120. For example, when the content area 1129 corresponding to a display screen having a 9:19 aspect ratio is mirrored to the target display 1120 having a resolution of 3840×2160 and a 16:9 aspect ratio, a width of the target display 1120 of the content area 1129 may be calculated as 2160×9/19=1023. However, this is only an example to promote understanding of the description, and the example is not limited thereto.

For example, a width of each area in the mirroring data may be determined using Equations 1 to 4 below.

$$\text{first margin width} = \frac{T - S\_max}{2} \quad \text{Equation 1}$$

$$\text{content area width} = \quad \text{Equation 2}$$
$$S\_min + (S\_max - S\_min) \times (\text{expansion rate})$$

$$\text{second margin width} = \quad \text{Equation 3}$$
$$\frac{T - S\_max}{2} + (S\_max - S\_min) \times (1 - \text{expansion rate})$$

$$\text{expansion rate} = \frac{s}{S\_max} \quad \text{Equation 4}$$

T may denote the width of the target display 1120. S_max may denote a width (e.g., a maximum width) when the display screen of the electronic device 1110 is extended to the maximum. S_min may denote a width (e.g., a minimum width) when the display screen of the electronic device 1110 is not expanded. An expansion rate may be a numerical value indicating an extent to which the display screen is expanded, and may be defined as a currently expanded width s compared to the maximum width S_max as expressed in Equation 4 above, but is not limited thereto.

A first margin area (e.g., a first margin portion 1121) may be a margin portion located on a left side of the content area 1129 in FIG. 11, and a second margin area (e.g., a second margin portion 1122) may be a margin portion located on a right side of the content area 1129. A first margin width of Equation 1 may be a width of the first margin area, and a second margin width of Equation 3 may be a width of the second margin area. As shown in Equation 1, since the first margin width is expressed only as a constant, the width of the first margin area may be fixed while the size of the display screen of the electronic device 1110 is changed.

Accordingly, the electronic device 1110 may fix the width of the first margin portion 1121 in the mirroring data for the first application while the expansion rate of the display screen changes. The electronic device 1110 may change the width of the second margin portion 1122 located opposite to the first margin portion 1121 with respect to the content area 1129 according to the expansion rate. In the target display 1120, a reference line 1190 corresponding to reference points of the content area 1129 may be fixed to a boundary line with the first margin portion 1121.

An example in which the display screen of the electronic device 1110 expands from left to right was described with reference to FIG. 11. FIG. 12 describes an example in which the display screen is expanded from right to left. Referring to FIG. 11, since the right side of the display screen is expanded, start coordinates (e.g., a leftmost x coordinate) of the screen of an electronic device 1210 may be maintained. Whereas, in the example illustrated in FIG. 12, since the display screen of the electronic device 1210 is extended to the left, the start coordinates (e.g., the leftmost x coordinate, as a zero point) of the display screen may be moved to the left. Accordingly, the electronic device 1210 may fix a reference line 1290 corresponding to reference points of a content area 1229 to a boundary of a first margin portion 1221 according to Equations 1 to 4 described above, and to adjust a second margin portion 1222, the mirroring start coordinates of the display screen may be dynamically adjusted as expressed in Equation 5 below.

$$\text{mirroring start coordinate} = (S\_max - S\_min) \times (1 - \text{expansion rate}) \quad \text{Equation 5}$$

The electronic device 1210 according to another embodiment may generate mirroring data in a form in which the content area 1229 output from a target display 1220 is expanded from left to right even when the display screen is expanded in a direction from right to left.

Referring to FIGS. 11 and 12, a mirroring operation of an electronic device mainly operated in a vertical mode (e.g., the portrait mode) has been described. Referring to FIG. 13, an example of a mirroring operation for the first application of the first category in the electronic device performing in a horizontal mode (e.g., the landscape mode) is described. The vertical mode may be a mode in which a screen is output based on a y-axis (e.g., a vertical axis) of an electronic device that is reduced, and the horizontal mode may be a mode in which a screen is output based on an x-axis (e.g., a horizontal axis) of the electronic device that is reduced.

An electronic device 1311 rotated in a first rotational direction (e.g., counter-clockwise) from the vertical mode may have a display screen expandable from, for example, bottom to top. The electronic device 1311 may fix a reference line 1390 (e.g., the largest y-coordinate in the content area) of the content area to a boundary (e.g., the largest y-coordinate in the target display) corresponding to the top of a target display 1321. An electronic device 1312 rotated in a second rotational direction (e.g., clockwise) opposite to the first rotational direction from the vertical mode may have a display screen expandable from, for example, top to bottom. The electronic device 1312 may fix the reference line 1390 of the content area to a boundary corresponding to the top of a target display 1322. Accordingly, the electronic devices 1311 and 1312 may provide a consistent mirroring experience to a user regardless of the portrait mode and/or the landscape mode.

Figure 14:
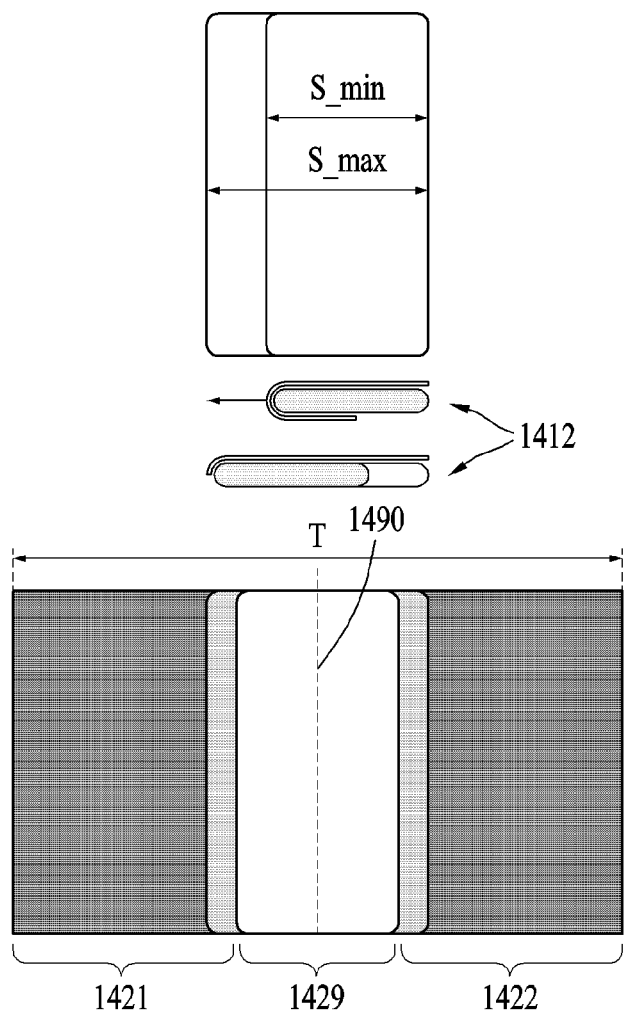
FIG. 14 is a diagram illustrating mapping of a central axis in mirroring according to an embodiment of the disclosure.
Figure 14:
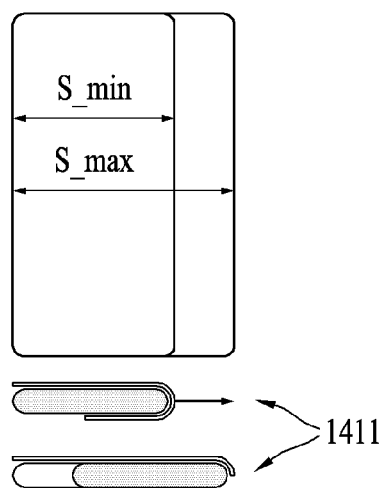

FIG. 14 is a diagram illustrating mapping of a central axis in mirroring according to an embodiment of the disclosure.

Referring to FIG. 14, electronic devices 1411 and 1412 (e.g., the electronic device 101 of FIG. 1) according to one embodiment may adjust widths of margin portions 1421 and 1422, so that in a mirroring operation, a central axis 1490 of a content area 1429 may be aligned with the central axis 1490 of a target display. The electronic devices 1411 and 1412 may adjust the width of the margin portions 1421 and 1422 in real time according to a change in a size of the display screen, thereby smoothly changing a size of the content area 1429 while maintaining a central point. When the central axes 1490 are mapped to each other, each width may be expressed as in Equations 6 and 7 below.

$$\text{first margin width} = \text{second margin width} = \frac{T - (S\_min + (S\_max - S\_min) \times \text{expansion rate})}{2} \quad \text{Equation 6}$$

$$\text{content area width} = S\_min + (S\_max - S\_min) \times \text{expansion rate} \quad \text{Equation 7}$$

As expressed above in Equations 6 and 7, a first margin width (e.g., the width of the first margin portion 1421) and a second margin width (e.g., the width of the second margin portion 1422) may be the same. Equation 7 described above may be the same as the aforementioned Equation 2. Accordingly, in the electronic devices 1411 and 1412, the central axis 1490 of the content area 1429 may be maintained at the central axis 1490 of the target display regardless of the expansion direction of the display screen. However, a zero point of the display screen of the electronic device 1412 having a display screen expandable from left to right may be adjusted according to the expansion rate as described in Equation 5 above.

Figure 15:
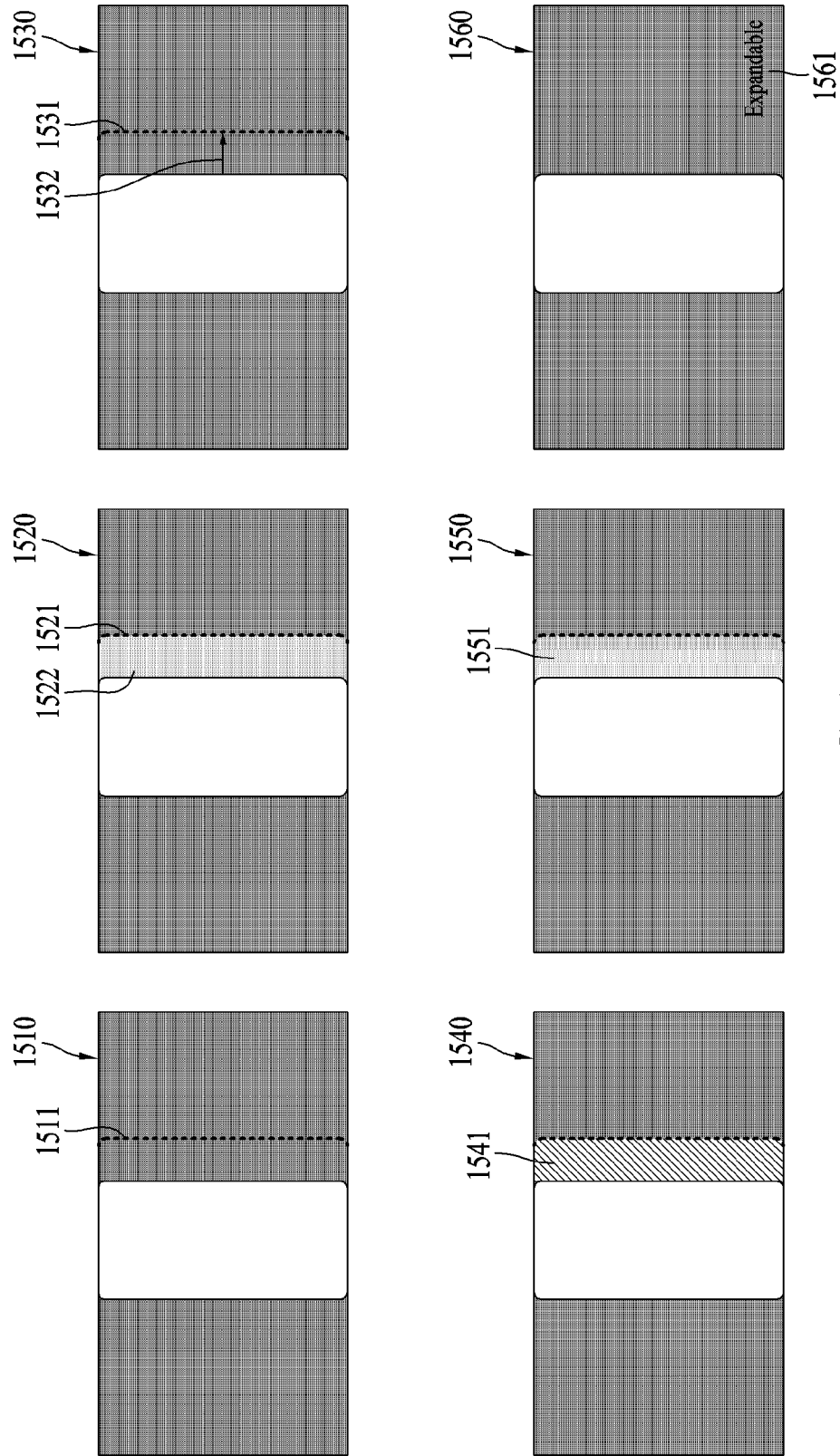
FIG. 15 is a diagram illustrating a guide of an expandable area in mirroring according to an embodiment of the disclosure.

FIG. 15 is a diagram illustrating a guide of an expandable area in mirroring according to an embodiment of the disclosure.

Referring to FIG. 15, an electronic device (e.g., the electronic device 101 of FIG. 1) according to another embodiment may generate mirroring data including a guide for an expandable area of a content area. The guide for the extendable area of the content area may be information indicating a length by which a current extension may be additionally extended on a display screen of the electronic device. The electronic device may generate the mirroring data including the expandable area represented by the guide based on at least one of an edge surrounding a portion corresponding to the expandable area among the margin area, a color different from a remaining area of the margin area, a graphic representation indicating a direction in which the content area is expanded, and a text informing whether or not the content area is expanded.

For example, the electronic device may generate a first mirroring data 1510 including a boundary 1511 surrounding a portion corresponding to the expandable area. For example, the electronic device may generate a second mirroring data 1520 including a boundary 1521 and a shadow 1522 surrounding a portion corresponding to the expandable area. For example, the electronic device may generate a third mirroring data 1530 including a boundary 1531 surrounding a portion corresponding to the expandable area and an arrow expression 1532 facing the boundary 1531. For example, the electronic device may generate a fourth mirroring data 1540 in which the expandable area is displayed in a color 1541 different from that of the margin area. For example, the electronic device may generate a fifth mirroring data 1550 in which the expandable area is displayed as a gradation expression 1551. For example, the electronic device may generate a sixth mirroring data 1560 including a guide 1561 on the expandable area.

Accordingly, during the mirroring operation, in a state in which center alignment is not completed before the display screen is fully expanded, the electronic device may provide the user with a graphic representation indicating a section to be potentially filled by the expansion of the display screen, thereby assisting the user's perception and relieving the burden of center alignment.

Figure 16:
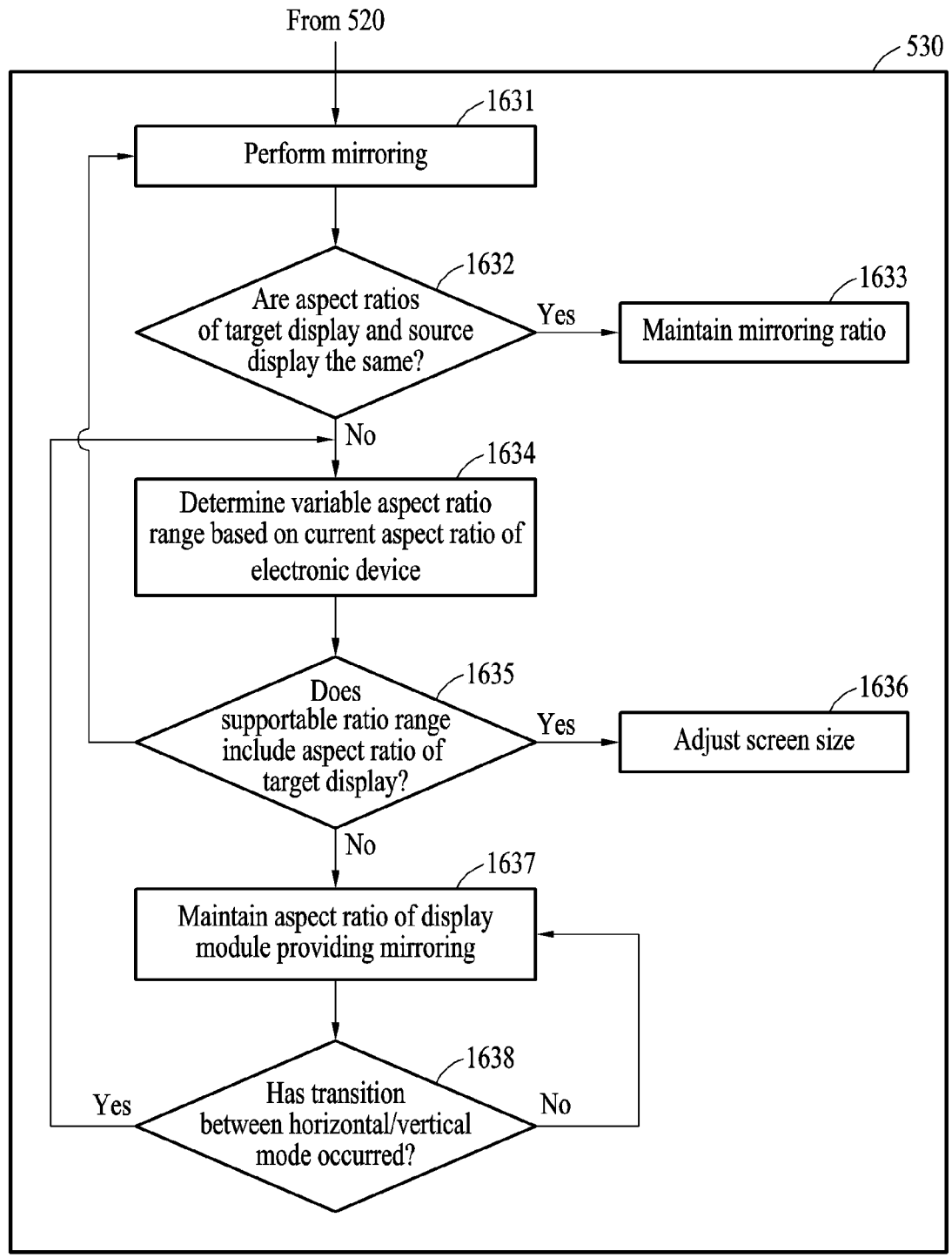
FIGS. 16 and 17 are diagrams illustrating an operation of automatically changing a screen size of an electronic device according to various embodiments of the disclosure.
Figure 17:
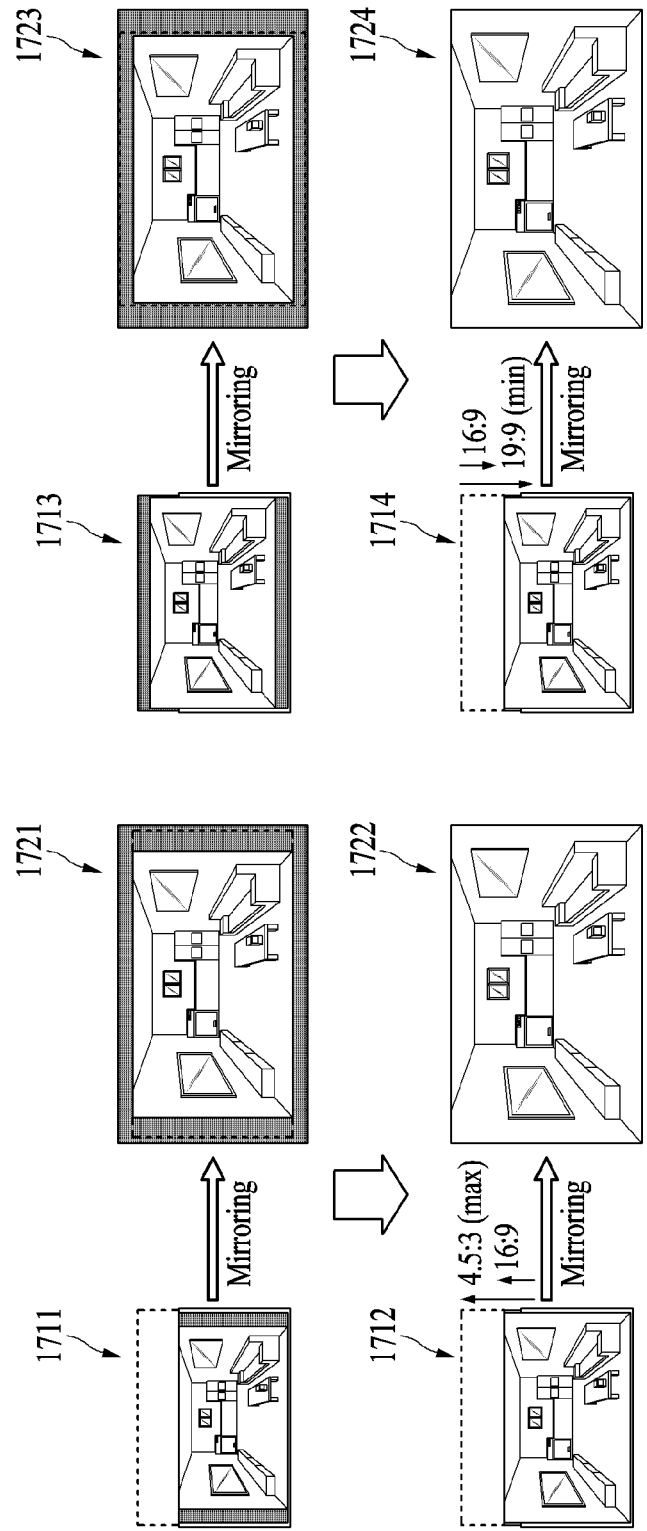

FIGS. 16 and 17 are diagrams illustrating an operation of automatically changing a screen size of an electronic device according to various embodiments of the disclosure.

Referring to FIGS. 16 and 17, according to one embodiment, an electronic device (e.g., the electronic device 101 of FIG. 1) may change (e.g., expand or reduce) a screen size of a display screen based on target display information so that an aspect ratio of a display screen of a display module matches an aspect ratio of a target display of a target device (e.g., the external electronic device 102 of FIG. 1). The electronic device may output the same image as an image mirrored on the target display through the display module without a margin.

For example, in operation 1631, the electronic device may perform mirroring. The electronic device may generate mirroring data including a content area having the same image as an application and content output from the display module during the mirroring operation. The electronic device may transmit the mirroring data to the target display, and the target display may playback a mirroring image based on the mirroring data received from the electronic device.

In operation 1632, the electronic device may determine whether an aspect ratio of the target display and a source display (e.g., a display module of the electronic device) is the same. The source display may be a display on which an image, content, and application, which are sources of mirroring, are output. In operation 1633, when the aspect ratio of the target display and the aspect ratio of the electronic device are the same, the electronic device may maintain the mirroring ratio.

In operation 1634, the electronic device may determine a variable aspect ratio range based on the current aspect ratio of the electronic device. For example, a range of aspect ratios that can be supported by an electronic device (hereinafter, "supportable ratio range") in the vertical mode may be 9:19 to 14.25:19. An aspect ratio of 14.25:19 may be interpreted as an aspect ratio of 3:4. For example, the supportable ratio range of an electronic device in the horizontal mode may be 19:9 to 19:14.25. An aspect ratio of 19:14.25 may be interpreted as an aspect ratio of 4:3.

In operation 1635, the electronic device may determine whether the supportable ratio range of the electronic device includes an aspect ratio of the target display information. For example, the aspect ratio of the target display information may be 16:9.

In the above-described example, when the supportable ratio range of the electronic device in the vertical mode is converted based on a y-axis length (e.g., as a vertical length, "9") among the aspect ratios of the target display information, the supportable ratio range may be interpreted as a ratio range of 4.26:9 to 6.75:9. Accordingly, the electronic device in the vertical mode may determine that a 16:9 aspect ratio of the target display is outside the supportable ratio range.

An example of an operation of the electronic device in the horizontal mode will be described below with reference to operation 1637.

For example, when the supportable ratio range of the electronic device in the horizontal mode is converted based on an x-axis length (e.g., as a horizontal length, "16") among the aspect ratios of the target display information, the supportable ratio range may be interpreted as a ratio range of 16:7.58 to 16:21.33. Accordingly, the electronic device in the horizontal mode may determine that the 16:9 aspect ratio of the target display is within the supportable ratio range. An example of an operation of the electronic device in the vertical mode will be described below with reference to operation 1636.

In operation 1637, when the aspect ratio of the target display of the target device is outside the supportable ratio range of the electronic device, the electronic device may maintain the aspect ratio (e.g., the mirroring ratio) of the display module providing the mirroring. For example, the electronic device may maintain the screen size of the display module. The electronic device may enlarge or reduce the size of the mirrored image based on an input (e.g., a pinch zoom-in and zoom-out) received from the user. In operation 1638, the electronic device may monitor whether a transition between the horizontal mode and the vertical mode occurs. When no mode change occurs, the electronic device may continue to maintain the mirroring ratio in operation 1637. When a mode change occurs, the electronic device may perform operation 1634 to determine a supportable ratio range again. This is because the supportable ratio range in the horizontal mode and the supportable ratio range in the vertical mode may be different.

In operation 1636, when the aspect ratio of the target device identified from the target display information is within a ratio range supported by the electronic device, the electronic device may output, from the display module, the same image as an image output from the target device without a margin area, by adjusting the screen size of the display module.

For example, the electronic device (e.g., the electronic device 101 of FIG. 1) in the horizontal mode may include display modules 1711 and 1713 having display screens that extend or contract in length along the first axis. When a ratio (e.g., 19/9) of a length (e.g., a vertical length as a y-axis length) along a first axis against a length (e.g., a horizontal length as an x-axis length) along a second axis of the display module 1711 is greater than a ratio (e.g., 16/9) of a length along a first axis (e.g., a vertical length as a y-axis) against a length along a second axis (e.g., a horizontal length as an x-axis) of a target display 1721 in the target display information of the target device, the electronic device may extend the display screen of the display module 1711 in one direction along the first axis of the display module 1711. A display screen 1712 and a target display 1722 adjusted to have an aspect ratio of 16:9 may equally output an image without a margin area. For example, in the electronic device, when a ratio (e.g., 4.5/3) of a length along a second axis against a length along a first axis of the display module 1713 is smaller than a ratio (e.g., 16/9) of a length along a second axis against a length along a first axis of a target display 1723 in the target display information of the target device, the electronic device may reduce the display screen of the display module 1713 in the other direction along the first axis of the display module 1713. A display screen 1714 and a target display 1724 adjusted to have an aspect ratio of 16:9 may equally output an image without a margin area. The above-described change in size of the display screen may happen automatically in response to a motor being driven during the mirroring operation. The electronic device may determine an amount by which to reduce or expand the display screen of the display module based on the aspect ratios of the target displays 1721 and 1723. The electronic device may change the size of the display screen by an amount corresponding to a degree to which the aspect ratios of the target displays 1721 and 1723 and the aspect ratios of the display modules are the same.

Accordingly, the electronic device may reduce the generation of margin areas and content clipping even when a target display having a different aspect ratio is mirrored.

Referring to FIGS. 16 and 17, although an electronic device in the vertical mode is mainly described as an example, the example is not limited thereto. In the above description, when the electronic device in the vertical mode determines that the aspect ratio of the target display is within the supportable ratio range in operation 1634, the electronic device may change the length of the display screen along the second axis (e.g., the horizontal axis). For example, when a ratio (e.g., 9/19) of a length along a second axis against a length along a first axis of the display module is smaller than a ratio (e.g., 16/9) of a length along a second axis against a length along a first axis of the target display in the target display information of the target device, the electronic device may expand the display screen of the display module in a direction along the second axis of the display module. This is because the target display is horizontally longer than the electronic device. On the contrary, when the target display is horizontally shorter than the electronic device, the electronic device may reduce the display screen in the direction along the second axis.

Figure 18:
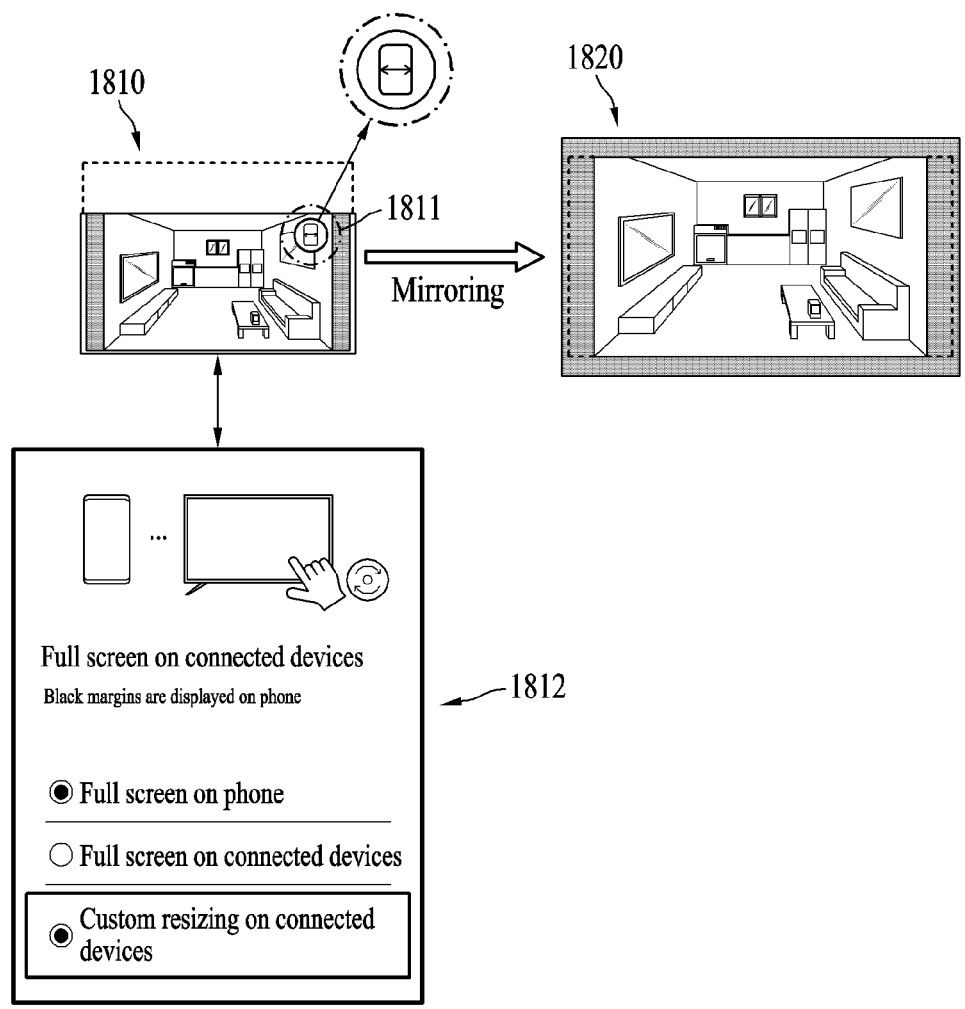
FIG. 18 is a diagram illustrating changing a screen size of an electronic device according to a setting according to an embodiment of the disclosure.

FIG. 18 is a diagram illustrating changing a screen size of an electronic device according to a setting according to an embodiment of the disclosure.

Referring to FIG. 18, an electronic device 1810 (e.g., the electronic device 101 of FIG. 1) according to one embodiment may output an interface presenting an inquiry as to whether an operation is to be performed to adjust a size of a display module when an aspect ratio of target display information is within a supportable screen range of the display module (e.g., the display module 160 of FIG. 1). For example, the electronic device 1810 may output an object 1811 indicating an operation of adjusting the size of the display module while mirroring an image on the display screen. The object 1811 may be a pop-up icon indicating an operation of one of expanding or reducing the size of the display screen of the display module.

The electronic device 1810 may change the size of the display screen of the display module of the electronic device 1810 based on an aspect ratio of a target display 1820 in response to a user input selecting the object 1811.

However, the example is not limited thereto, and the electronic device 1810 may automatically perform screen alignment according to a setting. For example, the electronic device 1810 may adjust the size of the display module based on the aspect ratio of the target display information when the aspect ratio of the target display information is within the supportable screen range of the display module and screen autofit is set. The electronic device 1810 may activate a custom size adjustment option for a connected device in a setting interface 1812 of the mirroring operation in response to a user input.

The electronic device 1810 according to another embodiment may perform the aforementioned mirroring operation of FIGS. 1, 2A, 2B, 3A, 3B, 4 to 18 on target devices such as a TV having an aspect ratio of 16:9, a vertical TV having an aspect ratio of 9:16, a tablet having various aspect ratios (e.g., 4:3, 16:19), and a monitor having an aspect ratio of 21:9. The electronic device 1810 may propose expansion or reduction according to the target display information (e.g., an aspect ratio) of the connected target device, and may automatically change the size of the display screen upon receiving approval to change the size by a user input. Accordingly, the electronic device 1810 may adjust the size of the display screen so that a black space (e.g., a margin area) of both the connected target device and the electronic device 1810 is minimized during mirroring.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a flexible display comprising a display screen in which an aspect ratio can be changed based on display expansion or reduction;
    a communication circuit configured to establish communication with a target device;
    a memory configured to store computer-executable instructions; and
    at least one processor configured to execute the computer-executable instructions by accessing the memory,
    wherein the at least one processor is configured to:
        receive display information of the target device from the target device using the communication circuit,
        expand or reduce the flexible display of the electronic device based on the display information of the target device,
        generate mirroring data comprising a content area in which content is displayed and an additional information area in which additional information is displayed based on the display information of the target device, and
        transmit the mirroring data to the target device using the communication circuit.

2. The electronic device of claim 1, wherein the display is configured to one of increase or decrease a size of the display screen by driving a motor.

3. The electronic device of claim 1, wherein the at least one processor is further configured to:
    change a size of the additional information area in the mirroring data based on a change in the aspect ratio of the display screen, and
    change the additional information based on a change in the size of the additional information area in the mirroring data.

4. The electronic device of claim 1, wherein the at least one processor is further configured to:
    decrease a display area allocated to the additional information based on a decrease in the size of the additional information area, and
    increase the display area allocated to the additional information based on an increase in the size of the additional information area.

5. The electronic device of claim 1, wherein the at least one processor is further configured to change the additional information in response to the change in the size of the additional information area exceeding a predetermined threshold change amount.

6. The electronic device of claim 1, wherein the at least one processor is further configured to remove the additional information from the mirroring data in response to the size of the additional information area being smaller than a minimum size.

7. The electronic device of claim 1, wherein the processor is further configured to, in response to the mirroring data being generated for a first application of a first category in which an amount of content is increased or additional content is provided with respect to screen expansion, fix a reference point of a content area in which the first application is displayed in the mirroring data for the first application, based on the display information of the target device.

8. The electronic device of claim 7, wherein the processor is further configured to determine, in the mirroring data for the first application, one or more point at which one or more reference point of the content area is fixed, based on a maximum expansion size of the flexible display and the display information of the target display.

9. The electronic device of claim 7, wherein the processor is further configured to:
    fix a width of a first margin portion in the mirroring data for the first application during a change of an expansion rate of the display screen, and
    change a width of a second margin portion located opposite to the first margin portion with respect to the content area according to the expansion rate.

10. The electronic device of claim 1, wherein the processor is further configured to, in response to the mirroring data being generated for a second application of a second category in which an area occupied by content increases with respect to screen expansion, map a central axis of a content area in which the second application is displayed in the mirroring data for the second application to a central axis of a target display of the target device, based on the display information of the target device.

11. The electronic device of claim 1, wherein the processor is further configured to generate the mirroring data comprising a guide to an expandable area of a content area.

12. The electronic device of claim 11, wherein the processor is further configured to:
    generate the mirroring data comprising the expandable area represented by the guide based on at least one of:
        an edge surrounding a portion corresponding to the expandable area among an additional information area,
        a color different from a remaining area of the additional information area,
        a graphic representation indicating a direction in which the content area is expanded, or
        a text informing whether or not the content area is expanded.

13. The electronic device of claim 1, wherein the processor is further configured to maintain a screen size of the flexible display in response to the aspect ratio of the target device being out of a ratio range supported by the electronic device.

14. The electronic device of claim 1, wherein the processor is further configured to, in response to the aspect ratio of the display information of the target device being within a ratio range supported by the electronic device, output, through the display, an image identical to an image output from the target device without an additional information area, by adjusting a screen size of the display.

15. The electronic device of claim 14, wherein the processor is further configured to, in response to a ratio of a length along a second axis against a length along a first axis of the flexible display being greater than a ratio of a length along a second axis against a length along a first axis of a target display in the display information of the target device of the target device, expand the display screen of the flexible display in one direction along the first axis of the flexible display.

16. The electronic device of claim 14, wherein the processor is further configured to, in response to a ratio of a length along a second axis against a length along a first axis of the flexible display being smaller than a ratio of a length along a second axis against a length along a first axis of a target display in the display information of the target device of the target device, reduce the display screen of the flexible display in one direction along the first axis of the flexible display.

17. The electronic device of claim 1, wherein the processor is further configured to output an interface inquiring as to whether an operation of adjusting a size of the flexible display is to be performed in response to the aspect ratio of the display information of the target device being within a supportable screen range of the flexible display.

18. The electronic device of claim 1, wherein the processor is further configured to adjust a size of the flexible display based on the aspect ratio of the display information of the target device in response to the aspect ratio of the display information of the target device being within a supportable screen range of the flexible display and screen autofit being set.

19. A method implemented by at least one processor, the method comprising:
  receiving display information of a target device from the target device using a communication circuit;
  expanding or reducing a flexible display of an electronic device based on the display information of the target device, the flexible display comprising a display screen in which an aspect ratio can be changed based on display expansion or reduction;
  generating mirroring data comprising a content area in which content is displayed and an additional information area in which additional information is displayed based on the display information of the target device; and
  transmitting the mirroring data to the target device using the communication circuit.

20. An electronic device, comprising:
  a display comprising a display screen;
  a communication circuit configured to establish communication with a target device;
  a memory configured to store computer-executable instructions; and
  at least one processor configured to execute the computer-executable instructions by accessing the memory,
  wherein the at least one processor is configured to:
    receive display information of the target device from the target device using the communication circuit,
    generate mirroring data comprising a content area in which content is displayed and an additional information area in which additional information is displayed in response to an aspect ratio of the display screen and an aspect ratio of the display information of the target device being different, and
    transmit the mirroring data to the target device using the communication circuit.

* * * * *